US009567931B2

(12) United States Patent
Kawakatsu et al.

(10) Patent No.: US 9,567,931 B2
(45) Date of Patent: Feb. 14, 2017

(54) CYLINDER-BY-CYLINDER AIR-FUEL RATIO CONTROLLER FOR INTERNAL COMBUSTION ENGINE

(71) Applicant: DENSO CORPORATION, Kariya, Aichi-pref. (JP)

(72) Inventors: Yasuhiro Kawakatsu, Kariya (JP); Noriaki Iwase, Kariya (JP)

(73) Assignee: DENSO CORPORATION, Kariya (JP)

( * ) Notice: Subject to any disclaimer, the term of this patent is extended or adjusted under 35 U.S.C. 154(b) by 867 days.

(21) Appl. No.: 13/886,979

(22) Filed: May 3, 2013

(65) Prior Publication Data

US 2013/0304356 A1 Nov. 14, 2013

(30) Foreign Application Priority Data

May 11, 2012 (JP) ................................ 2012-109809
Feb. 5, 2013 (JP) .................................. 2013-20102

(51) Int. Cl.

*G06F 7/00* (2006.01)
*F02D 41/14* (2006.01)
*F02D 41/00* (2006.01)
*F02D 41/24* (2006.01)

(52) U.S. Cl.

CPC ......... *F02D 41/1473* (2013.01); *F02D 41/008* (2013.01); *F02D 41/1456* (2013.01); *F02D 41/1458* (2013.01); *F02D 41/248* (2013.01); *F02D 41/2451* (2013.01); *F02D 41/2461* (2013.01); *F02D 2250/14* (2013.01)

(58) Field of Classification Search

CPC .. F02D 41/1473; F02D 41/008; F02D 41/248; F02D 41/1456; F02D 41/1458; F02D 41/2451; F02D 2250/14; F02D 41/2461
See application file for complete search history.

(56) References Cited

U.S. PATENT DOCUMENTS 5,636,621 A * 6/1997 Maki .................. F02D 41/1402 123/480
5,657,736 A 8/1997 Maki et al.
5,806,506 A * 9/1998 Kitamura .............. F02D 41/008 123/673
6,499,474 B2 * 12/2002 Wachi ................ F02D 41/1474 123/443

(Continued)

*Primary Examiner* — Mahmoud Gimie
*Assistant Examiner* — David Hamaoui
(74) *Attorney, Agent, or Firm* — Nixon & Vanderhye P.C.

(57) ABSTRACT

When executing a Local-learning, an air-fuel ratio detecting time is corrected so that a dispersion of detection values of an air-fuel ratio sensor becomes a maximum value in one cycle of an engine. While executing a cylinder-by-cylinder air-fuel ratio control, a Global-learning is executed. In the Global-learning, the air-fuel ratio detecting time is corrected based on a relationship between a variation in estimated air fuel ratio of each cylinder and a variation in fuel quantity correction value of each cylinder. In the Global-learning, a computer computes a correlation coefficient between the variation in estimated air-fuel ratio and the variation in fuel quantity correction value of the cylinder for each case where the cylinder assumed to correspond to the estimated air fuel ratio is hypothetically varied in multiple ways. Then, the air-fuel ratio detecting time is corrected so that this correlation coefficient becomes a maximum value.

3 Claims, 19 Drawing Sheets

(56) References Cited

U.S. PATENT DOCUMENTS

| | | | | |
|---|---|---|---|---|
| 7,063,080 | B2 * | 6/2006 | Kita | F02D 41/008 123/673 |
| 7,356,985 | B2 * | 4/2008 | Hirata | F02D 41/008 123/673 |
| 7,721,591 | B2 * | 5/2010 | Maegawa | F02D 41/1454 73/114.72 |
| 2005/0121010 | A1 | 6/2005 | Kita et al. | |
| 2015/0068505 | A1 * | 3/2015 | Iwase | F02D 41/008 123/673 |
| 2015/0075507 | A1 * | 3/2015 | Iwase | F02D 41/0085 123/673 |
| 2015/0369152 | A1 * | 12/2015 | Nakagawa | F02D 41/0085 123/445 |

* cited by examiner

FIG. 11

(COMBUSTION ORDER : #1→#3→#4→#2)

| ESTIMATED AIR-FUEL RATIO AT CURRENT AFRDT | (a) CURRENT+0CA | (b) CURRENT+180CA | (c) CURRENT+360CA | (d) CURRENT+540CA |
|---|---|---|---|---|
| φ^#1 | #1 | #2 | #4 | #3 |
| φ^#3 | #3 | #1 | #2 | #4 |
| φ^#4 | #4 | #3 | #1 | #2 |
| φ^#2 | #2 | #4 | #3 | #1 |

CYLINDER-BY-CYLINDER AIR-FUEL RATIO CONTROLLER FOR INTERNAL COMBUSTION ENGINE

CROSS-REFERENCE TO RELATED APPLICATION

This application is based on Japanese Patent Applications No. 2012-109809 filed on May 11, 2012 and No. 2013-020102 filed on Feb. 5, 2013, the disclosures of which are incorporated herein by reference.

TECHNICAL FIELD

The present disclosure relates to a cylinder-by-cylinder air-fuel ratio controller which can estimate an air-fuel ratio in each cylinder based on a detection value of an air-fuel ratio sensor disposed in a confluent portion of an exhaust gas emitted from an internal combustion engine.

BACKGROUND

Japanese Patent No. 4321411 shows a system which performs a cylinder-by-cylinder air-fuel ratio control. In the cylinder-by-cylinder air-fuel ratio control, an air-fuel ratio in each cylinder of an internal combustion engine is estimated based on a detection value of an air-fuel ratio sensor disposed in a confluent portion of an exhaust gas emitted from the internal combustion engine. Based on the estimated air-fuel ratio of each cylinder, the actual air-fuel ratio of each cylinder is controlled. While performing the cylinder-by-cylinder air-fuel ratio control, based on a dispersion in estimated air-fuel ratio of each cylinder, a computer determines a deviation of air-fuel ratio detecting time with respect to each cylinder. Based on a relationship between a variation in estimated air-fuel ratio of at least one cylinder and a variation in its corrected amount of fuel, an air-fuel ratio detecting time of each cylinder is corrected.

Specifically, when the computer determines that the air-fuel ratio detecting time deviates while performing the cylinder-by-cylinder air-fuel ratio control, the air-fuel ratio detecting time is retarded by a specified crank angle (for example, 30 CA degree) from the current air-fuel ratio detecting time or the most advanced time. The computer repeats the processing in which a correlation coefficient is computed by multiplying a variation in estimated air-fuel ratio of at least one cylinder and a variation in corrected fuel amount. A time point at which the correlation coefficient becomes the most appropriate is learned as the most appropriate air-fuel ratio detecting time. Then, the computer corrects the air-fuel ratio detecting time to the most appropriate time.

In the above system, when the most appropriate air-fuel ratio detecting time significantly deviates from the current air-fuel ratio detecting time or the most advanced time (for example, 360 CA degree), it is necessary to repeatedly perform the processing in which the air-fuel ratio detecting time is retarded by a specified crank angle (for example, 30 CA degree) and the correlation coefficient is computed many times. Thus, it may take a long time period to correct the air-fuel ratio detecting time. As above, when it takes a long time period to correct the air-fuel ratio detecting time, the air-fuel-ratio dispersion between each cylinder may not be corrected appropriately, which may cause a deterioration in exhaust emission. Also, a malfunction of the air-fuel ratio sensor may not be detected.

SUMMARY

It is an object of the present disclosure to provide a cylinder-by-cylinder air-fuel ratio controller which can estimate an air-fuel ratio in each cylinder based on a detection value of an air-fuel ratio sensor disposed in a confluent portion of an exhaust gas emitted from an internal combustion engine. Further, the air-fuel ratio controller is capable of correcting a deviation in sampling time of outputs of the air-fuel ratio sensor with high accuracy and in a short period. The sampling time of outputs of the air-fuel ratio sensor is referred to as an air-fuel ratio detecting time.

According to the present disclosure, a cylinder-by-cylinder air-fuel ratio controller is applied to an internal combustion engine which is provided with an air-fuel ratio sensor detecting an air-fuel ratio of an exhaust gas at a confluent portion into which the exhaust gas flows from multiple cylinders of the internal combustion engine; a cylinder-by-cylinder air-fuel-ratio estimation portion estimating the air-fuel ratio of each cylinder based on a detection value which the air-fuel ratio sensor detects at an air-fuel ratio detecting time for each cylinder; and a cylinder-by-cylinder air-fuel ratio control portion executing a cylinder-by-cylinder air-fuel ratio control in which the air-fuel ratio of each cylinder is adjusted based on the estimated air-fuel ratio of each cylinder.

The cylinder-by-cylinder air-fuel ratio controller includes: a first time-correction portion correcting the air-fuel ratio detecting time in such a manner that a dispersion of the detection values of the air fuel ratio sensor becomes maximum in one cycle of the internal combustion engine; and a second time-correction portion correcting the air-fuel ratio detecting time based on a relationship between a variation in estimated air-fuel ratio of at least one cylinder and a variation in correction value of said cylinder.

The second time-correction portion computes a correlation coefficient between the variation in estimated air-fuel ratio and the variation in correction value of the cylinder with respect to at least one of the cylinders for each case where the cylinder assumed to correspond to the estimated air fuel ratio is hypothetically varied in multiple ways. Then, the air-fuel ratio detecting time is corrected so that this correlation coefficient becomes a maximum value.

BRIEF DESCRIPTION OF THE DRAWINGS

The above and other objects, features and advantages of the present disclosure will become more apparent from the following detailed description made with reference to the accompanying drawings. In the drawings:

FIG. 11 is a chart showing assumed cylinders in a case that an air-fuel ratio detecting time is assumed to be varied;

DETAILED DESCRIPTION

Figure 1:
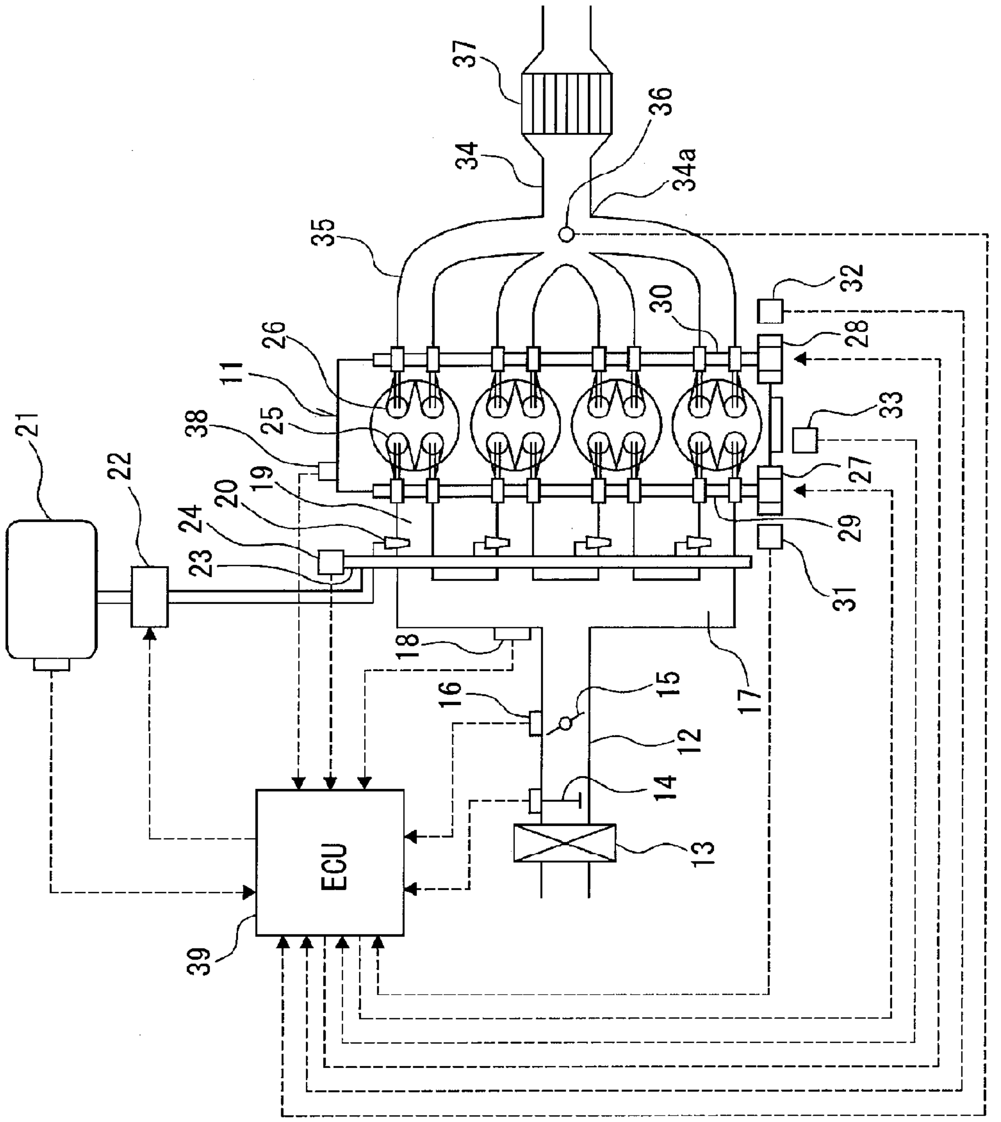
FIG. 1 is a schematic view of an engine control system according to a first embodiment of the present invention.

Embodiments of the present invention will be described, hereinafter.

First Embodiment

Referring to FIGS. 1 to 12, a first embodiment will be described hereinafter. First, referring to FIG. 1, an engine control system is explained.

A four-cylinder engine 11 has a first cylinder #1, a second cylinder #2, a third cylinder #3 and a fourth cylinder #4. An air cleaner 13 is arranged upstream of an intake pipe 12 of an internal combustion engine 11. An airflow meter 14 detecting an intake air flow rate is provided downstream of the air cleaner 13. A throttle valve 15 driven by a DC-motor and a throttle position sensor 16 detecting a throttle position are provided downstream of the air flow meter 14.

A surge tank 17 including an intake air pressure sensor 18 is provided downstream of the throttle valve 15. The intake air pressure sensor 18 detects intake air pressure. An intake manifold 19 which introduces air into each cylinder of the engine 11 is provided downstream of the surge tank 17, and the fuel injector 20 which injects the fuel is provided at a vicinity of an intake port of the intake manifold 19 of each cylinder. While the engine 11 is running, the fuel in the fuel tank 21 is supplied to a delivery pipe 23 by a fuel pump 22. The fuel injector 20 provided to each cylinder injects the fuel into a cylinder. A fuel pressure sensor 24 detecting a fuel pressure is attached to the delivery pipe 23.

The engine 11 is provided with variable valve timing controllers 27, 28 which respectively adjust a valve timing of an intake valve 25 and an exhaust valve 26. Furthermore, the engine 11 is provided with an intake-cam-angle sensor 31 and an exhaust-cam-angle sensor 32. A crank angle sensor 33 is arranged for detecting a rotational angle of a crankshaft. The crank angle sensor 33 outputs a crank angle signal when the crankshaft rotates 30 CA degree, for example.

At a confluent portion 34*a* of an exhaust manifold 35, an air-fuel ratio sensor 36 which detects the air-fuel ratio of the exhaust gas is provided. A three-way catalyst 37 which purifies the exhaust gas is provided downstream of the air-fuel ratio sensor 36. A coolant temperature sensor 38 detecting coolant temperature is fixed on the cylinder block of the engine 11.

The outputs of the above sensors are transmitted to an electronic control unit (ECU) 39. The ECU 39 includes a microcomputer which executes an engine control program stored in a Read Only Memory (ROM) to control a fuel injection quantity, an ignition timing, a throttle position (intake air flow rate) and the like.

When an air-fuel-ratio feedback control execution condition is established, the ECU 39 executes an air-fuel ratio feedback control in which the air-fuel ratio of the air-fuel mixture is controlled based on the output of the air-fuel ratio sensor 36 so that the air-fuel ratio of the exhaust gas agrees with the target air-fuel ratio.

Figure 2:
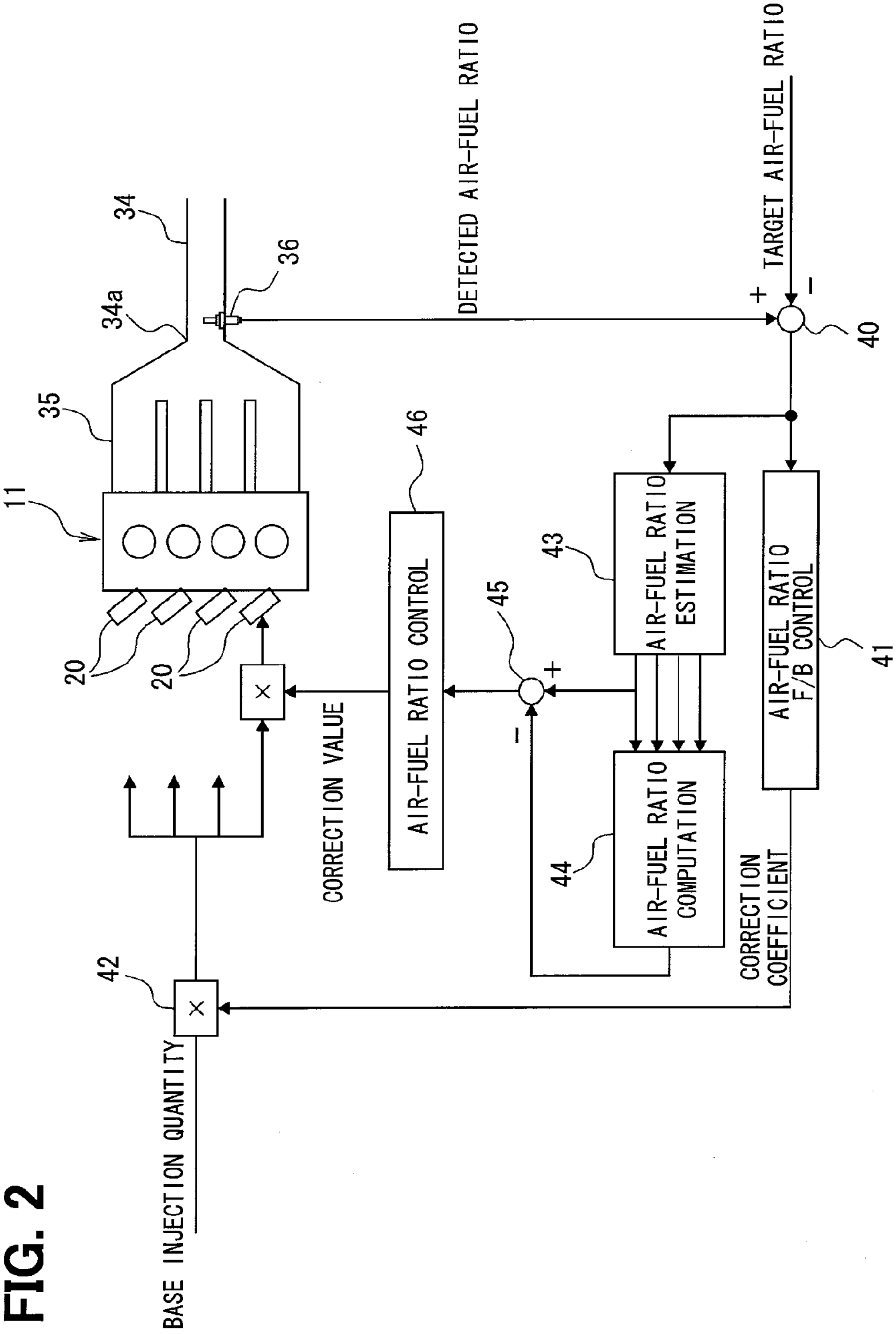
FIG. 2 is a block diagram for explaining an air-fuel ratio control.

Specifically, as shown in FIG. 2, a difference computing portion 40 computes a difference between the detected air-fuel ratio (air-fuel ratio of exhaust gas detected by the air-fuel ratio sensor 36) and the target air-fuel ratio. An air-fuel ratio feedback control portion 41 computes a correction coefficient in order to reduce the difference. An injection-quantity computing portion 42 computes a fuel injection quantity based on a base quantity and the correction coefficient, which are computed based on an engine speed and an engine load. Each of fuel injectors 20 injects the fuel of the computed injection quantity.

Figure 4:
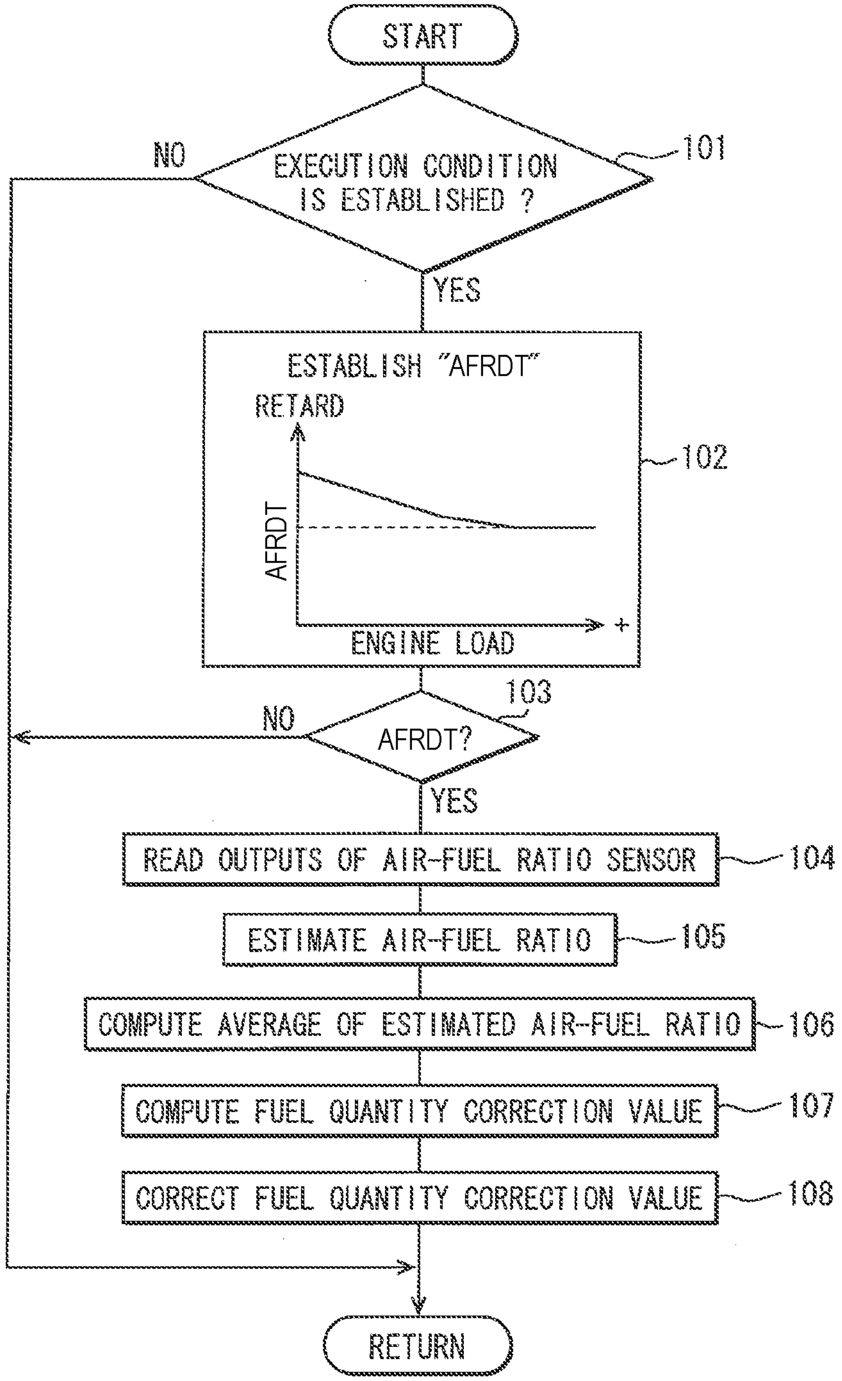
FIG. 4 is a flow chart showing a processing of a cylinder-by-cylinder air-fuel ratio control routine.

Furthermore, the ECU 39 executes a cylinder-by-cylinder air-fuel ratio control routine shown in FIG. 4, whereby the air-fuel ratio of each cylinder is estimated based on a detection value of an air-fuel ratio sensor 36. The air-fuel ratio sensor 36 detects the air-fuel ratio of each cylinder at an air-fuel ratio detecting time for each cylinder. The air-fuel ratio detecting time is referred to as AFRDT, hereinafter. Based on the estimated air-fuel ratio of each cylinder, the air-fuel ratio of each cylinder is controlled. Such a control is referred to as a cylinder-by-cylinder air-fuel ratio control.

Specifically, as shown in FIG. 2, an air-fuel-ratio estimation portion 43 estimates the air-fuel ratio of each cylinder based on the detection value (actual air fuel ratio of the exhaust gas flowing through the confluent portion 34*a*) of the air fuel ratio sensor 36 by using of an air-fuel-ratio estimation model, which will be described later. A reference air-fuel-ratio computation portion 44 computes an average value of the estimated air fuel ratio of all cylinders. The computed average value is defined as a reference air-fuel ratio (target air fuel ratio of all cylinders). Then, an air-fuel-ratio deviation computation portion 45 computes a deviation between the estimated air fuel ratio of each cylinder and the reference air-fuel ratio. An air-fuel-ratio control portion 46 computes a correction value (fuel quantity correction value) of each cylinder so that the deviation between the estimated air fuel ratio of each cylinder and the reference air-fuel ratio becomes smaller. Based on the fuel quantity correction value, the fuel injection quantity of each cylinder is corrected, whereby the air-fuel-ratio dispersion between cylinders is reduced.

The air-fuel-ratio estimation model will be specifically described, hereinafter. The air-fuel ratio estimation model is for estimating the air-fuel ratio of each cylinder based on the detection value (actual air fuel ratio of the exhaust gas flowing through the confluent portion).

In view of a heat exchange in the confluent portion 34*a*, the detected value of the air-fuel ratio sensor 36 is modeled by adding the history of the estimated air-fuel ratio of each cylinder at the confluent portion 34*a* to a history of the detected value of the air-fuel ratio sensor 36. The histories are multiplied by a specified weight. Kalman filter is used as an observer.

More specifically, a model of gas-exchange at the confluent portion 34*a* is approximated by the following formula (1):

$$ys(t)=k1\times u(t-1)+k2\times u(t-2)-k3\times ys(t-1)-k4\times ys(t-2) \quad (1)$$

wherein "ys" represents a detected value of the air-fuel ratio sensor 36, "u" represents an air-fuel ratio of gas flowing into the fluent-portion 34*a*, and "k1" to "k4" represent constants.

In the exhaust system, there are a first order lag of exhaust gas flowing into the confluent portion 34*a* and a first order lag of a response of the air-fuel ratio sensor 36. In view of these first order lags, the past two histories are referred in the above formula (1).

The above formula (1) is converted into a state space model, whereby following formulas (2a) and (2b) are derived.

$$X(t+1)=A\cdot X(t)+B\cdot u(t)+W(t) \quad (2a)$$

$$Y(t)=C\cdot X(t)+D\cdot u(t) \quad (2b)$$

wherein, "A", "B", "C" and "D" represent parameters of the model, "Y" represents the detected value of the air-fuel ratio sensor 36, "X" represents the estimate air-fuel ratio of each cylinder as a state variable, and "W" represents noise.

Furthermore, based on the above formulas (2a) and (2b), the Kalman filter is obtained as shown by the following formula (3):

$$X\hat{}(k+1|k)=A\cdot X\hat{}(k|k-1)+K\{Y(k)-C\cdot A-X\hat{}(k|k-1)\} \quad (3)$$

wherein X^ represents the estimated air-fuel ratio of each cylinder and "K" represents Kalman gain. X^(k+1|k) represents to obtain an estimation value at a time (k+1) based on the estimation value at a time (k).

As described above, the air-fuel ratio estimation model is configured by Kalman-filter type observer, whereby the air-fuel ratio of each cylinder can be successively estimated along with an advance of a combustion cycle.

Next, a method for establishing the AFRDT of each cylinder will be explained. In view of a response delay of the air-fuel ratio sensor, the AFRDT of each cylinder is established according to an engine driving condition (engine speed, engine load, etc.) by use of a map. The output of the air-fuel ratio sensor 36 is transmitted to the ECU 39. Since the response delay of an exhaust gas system becomes larger as the engine load becomes smaller, the AFRDT is established in such a manner as to shift in a retard direction as the engine load becomes smaller.

However, a length of the exhaust manifold 35 from the exhaust port of each cylinder to the air-fuel ratio sensor 36 is different between each cylinder. The flow of the exhaust gas emitted from each cylinder varies according to the engine driving condition. Further, the response delay of the air-fuel ratio sensor varies due to a manufacture dispersion of the engine 11 and a deterioration with age. Thus, it is difficult to accurately make a map between the response delay of the air-fuel ratio sensor and an engine load before the engine is designed and manufactured. The AFRDT of each cylinder may shift from the proper AFRDT.

If the AFRDT deviates, an estimation accuracy of the air fuel ratio of each cylinder is deteriorated and the dispersion of the estimated air fuel ratio between cylinders does not become smaller even if the cylinder-by-cylinder air-fuel ratio control is continued.

According to the first embodiment, the ECU 39 executes each of routines shown in FIGS. 5 to 10, whereby a Local-learning and a Global-learning are execute d. In the Local-learning, the AFRDT is corrected so that the dispersion of the detection values of the air fuel ratio sensor 36 becomes a maximum value in one cycle (720 CA degree) of the engine 11. In the Global-learning, the AFRDT is corrected based on a relationship between a variation of the estimated air fuel ratio of at least one cylinder and a variation of the correction value (fuel quantity correction value), after the Local-learning is executed. It should be noted that the estimated air fuel ratio is assumed to correspond to one of cylinders #1 to #4. In the Global-learning, the cylinder corresponding to the estimated air fuel ratio is hypothetically varied from the cylinder #1 to the cylinder #4. With respect to at least one of the cylinders #1 to #4, a correlation coefficient between the variation of the estimated air fuel ratio and the variation of the fuel quantity correction value is computed. Then, the AFRDT is corrected so that this correlation coefficient becomes a maximum value.

Figure 3:
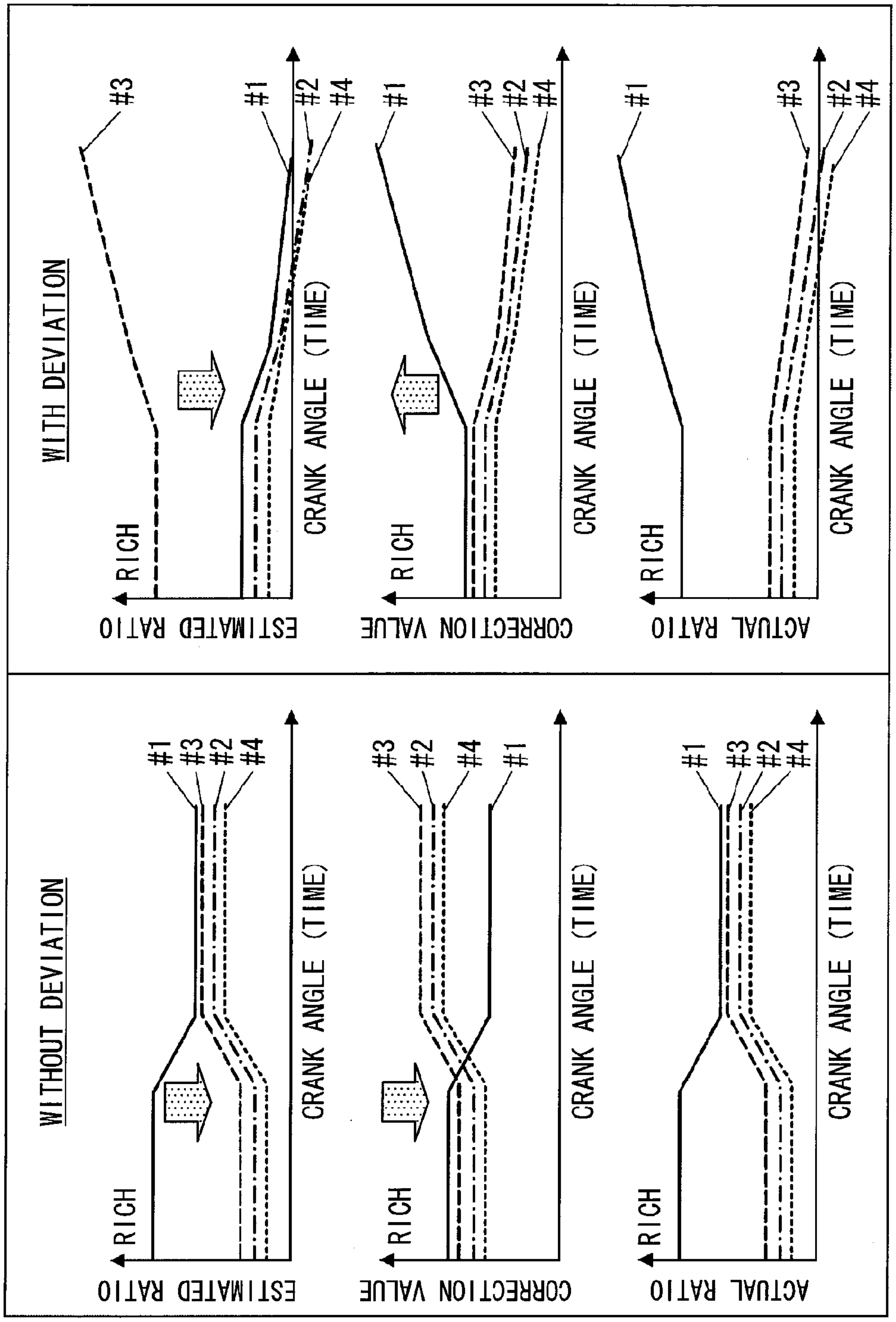
FIG. 3 is a chart showing an estimated air fuel ratio of each cylinder, a correction value of each cylinder, and an actual air-fuel ratio of each cylinder.

When the AFRDT of one cylinder deviates, it is not always that its correct AFRDT is close to the current AFRDT of the cylinder. For example, it can be assumed that the correct AFRDT may be an AFRDT of a successive combustion cylinder or may be more retarded. Alternatively, it can be assumed that the correct AFRDT may be an AFRDT of a previous combustion cylinder or may be more advanced. For example, as shown in FIG. 3, in a case that the correct AFRDT of the first cylinder #1 deviates to the current AFRDT of the third cylinder #3, an AFRDT at which the actual air-fuel ratio of the first cylinder #1 is most correctly detected is the current AFRDT of the third cylinder #3, not of the first cylinder #1. If the cylinder-by-cylinder air-fuel ratio control is executed based on the fuel quantity correction value which is computed based on the estimated air-fuel ratio of the first cylinder #1 which is estimated at the current AFRDT of the first cylinder #1, the actual air-fuel ratio of the first cylinder #1 varies according to the variation of the fuel quantity correction value of the first cylinder #1. However, the estimated air-fuel ratio of the first cylinder #1 is not varied according to the variation of the fuel quantity correction value of the first cylinder #1. The estimated air-fuel ratio of the third cylinder #3 is varied according to the variation of the fuel quantity correction value of the first cylinder #1.

In view of the above characteristics, according to the present embodiment, the Global-learning is executed in order to correct the AFRDT based on the relationship between the variation of the estimated air fuel ratio of at least one cylinder and the variation of the fuel quantity correction value. Thus, a deviation of the AFRDT can be corrected. Furthermore, in the Global-learning, the cylinder corresponding to the estimated air fuel ratio is hypothetically varied from the cylinder #1 to the cylinder #4. With respect to at least one of the cylinders #1 to #4, a correlation coefficient between the variation of the estimated air fuel ratio and the variation of the fuel quantity correction value is computed. Based on the correlation coefficient, the AFRDT is corrected. Thereby, it is unnecessary to compute the correlation coefficient by shifting the current AFRDT sequentially. Based on the estimated air-fuel ratio and the fuel quantity correction value at the current AFRDT, each correlation coefficient of the assumption cylinder hypothetically changed can be computed simultaneously. Even if the most appropriate AFRDT deviates from the current AFRDT significantly, the deviation therebetween can be corrected in a short time period.

For example, in a case that the correct AFRDT of the first cylinder #1 deviates to a middle time point between the current AFRDTs of the second cylinder #2 and the fourth cylinder #4, an AFRDT at which the actual air-fuel ratio of the first cylinder #1 is most correctly detected is the middle time point between the current AFRDTs of the second cylinder #2 and the fourth cylinder #4, not of the first cylinder #1. Since the estimated air-fuel ratio at the AFRDT that is most correlative to the correction value (fuel quantity correction value) of the first cylinder #1 can to be obtained by an estimation at the current AFRDT, it is likely that the AFRDT can not be corrected to the most appropriate time. Therefore, it is preferable that any one of the detection value of the air fuel sensor 36 at the AFRDT of each cylinder is the correct value of the actual air-fuel ration of one of the cylinders.

According to the present embodiment, in the Local-learning, the AFRDT is corrected so that the dispersion of the detection values of the air fuel ratio sensor 36 becomes a maximum value in one cycle (720 CA degree) of the engine 11. Although the actual air-fuel ratio varies in one cycle of the engine, the variation in air-fuel ratio can be detected as much as possible. Any one of detected values of the air-fuel ratio sensor 36 detected at the AFRDT of one cylinder accurately represents the actual air-fuel ratio of the cylinder. Thereby, any one of the estimated air-fuel ratio of one cylinder represents the actual air-fuel ratio of the cylinder. In the Global-learning, a deviation of the AFRDT between cylinders can be accurately corrected.

Referring to FIGS. 4 to 10, a processing of each routine which the ECU 39 executes will be described hereinafter.

[Cylinder-by-Cylinder Air-Fuel Ratio Control Routine]

A cylinder-by-cylinder air-fuel ratio control routine shown in FIG. 4 is executed in synchronization with an output pulse of the crank angle sensor 33. This cylinder-by-cylinder air-fuel ratio control routine corresponds to a cylinder-by-cylinder air-fuel ratio control portion. In step 101, the computer determines whether an execution condition of the cylinder-by-cylinder air-fuel ratio control is established. The execution condition includes following conditions (1)-(4):

(1) The air-fuel ratio sensor 36 is activated.

(2) The air fuel ratio sensor 36 has no malfunction.

(3) The engine 11 is in warming-up condition (for example, cooling water temperature is higher than a specified temperature).

(4) An engine driving region (for example, engine speed and intake air pressure) is a driving region in which an air-fuel-ratio estimation accuracy can be ensured.

When the above four conditions (1)-(4) are satisfied, the execution condition of cylinder-by-cylinder air-fuel ratio control is established. If at least one of the conditions is not satisfied, the execution condition is not established. When the execution condition is not established, the routine ends.

Meanwhile, when the execution condition is established, the procedure proceeds to step 102 in which the AFRDT of each cylinder is established on a map according to the current engine load (for example, intake air pressure). Alternatively, the AFRDT of each cylinder may be established on a map according to the current engine load and the current engine speed. The map for establishing the AFRDT is corrected by executing the Local-learning routine shown in FIG. 7 and the Global-learning routine shown in FIG. 9.

Then, the procedure proceeds to step 103 in which the computer determines whether the current crank angle corresponds to the AFRDT established in step 102. When the answer is NO, the routine ends.

When the answer is YES in step 103, the procedure proceeds to step 104 in which the computer reads the output (air-fuel-ratio detection value) of the air fuel ratio sensor 36. Then, the procedure proceeds to step 105 in which the air-fuel ratio of the subject cylinder is estimated based on the detection value of the air fuel ratio sensor 36 by using of the air-fuel-ratio estimation model. This process in step 105 corresponds to an air-fuel ratio estimation portion. Then, the procedure proceeds to step 106 in which the computer computes an average value of the estimated air fuel ratio of all cylinders. The computed average value is defined as a reference air-fuel ratio (target air-fuel ratio of all cylinders).

Then, the procedure proceeds to step 107 in which the computer computes a deviation between the estimated air fuel ratio of each cylinder and the reference air-fuel ratio. Further, the computer computes the fuel quantity correction value so that the deviation becomes smaller. Then, the procedure proceeds to step 108 in which the fuel injection quantity of each cylinder is corrected based on the fuel quantity correction value of each cylinder. The air-fuel ratio of the air-fuel mixture supplied to each cylinder is corrected so that the air-fuel-ratio dispersion between cylinders becomes smaller.

[AFRDT Deviation Determination Routine]

Figure 5:
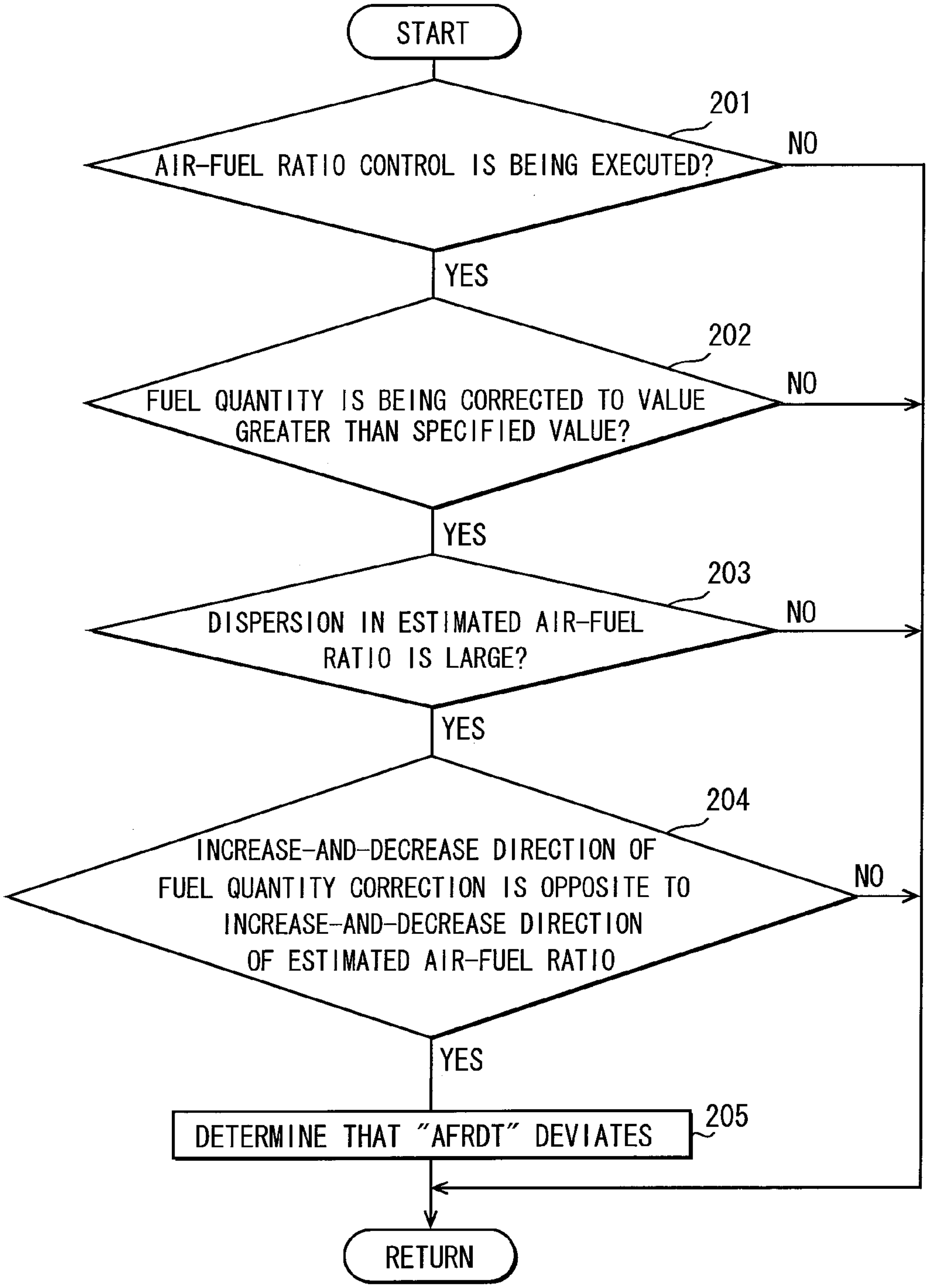
FIG. 5 is a flow chart showing a processing of an air-fuel ratio detecting time deviation determination routine.

An AFRDT deviation determination routine shown in FIG. 5 is executed in synchronization with an output pulse of the crank angle sensor 33. In step 201, the computer determines whether the cylinder-by-cylinder air-fuel ratio control is being executed. When the answer is NO in step 201, the routine ends.

When the answer is YES in step 201, the procedure proceeds to step 202 in which the computer determines whether the fuel quantity is being corrected to a value greater than a specified value based on at least one of the following conditions (A1) to (A3):

(A1) Based on whether a difference between a maximum fuel quantity correction value and a minimum fuel quantity correction value is greater than or equal to a specified value, the computer determines whether the above fuel quantity correction is being executed.

(A2) Based on whether a standard deviation of the fuel quantity correction value in all cylinders is greater than or equal to a specified value, the computer determines whether the above fuel quantity correction is being executed.

(A3) Based on whether an elapsed time after the fuel quantity correction starts is greater than a specified time, the computer determines whether the above fuel quantity correction is being executed.

When the answer is NO in step 202, the procedure of this routine ends. When the answer is YES in step S202, the procedure proceeds to step 203 in which the computer determines whether a dispersion degree of the estimated air fuel ratio between cylinders is large based on a following condition (B1) and/or a condition (B2).

(B1) Based on whether a difference between a maximum estimated air-fuel ratio and a minimum estimated air-fuel ratio is greater than or equal to a specified value, the computer determines whether the above dispersion degree of the estimated air fuel ratio is large.

(B2) Based on whether a standard deviation of the estimated air-fuel ratio of all cylinders is greater than or equal to a specified value, the computer determines whether the above dispersion degree of the estimated air fuel ratio is large.

When the answer is NO in step 203, the computer determines that the current AFRDT is correct to end the routine. When the answer is YES in step 203, the computer determines that the current AFRDT deviates. The procedure proceeds to step 204 in which the computer determines whether an increase-and-decrease direction of the fuel quantity correction value is opposite to an increase-and-decrease direction of the estimated air fuel ratio, based on whether a deviation between a rate of change of the fuel quantity correction value of each cylinder and a rate of change of the estimated air-fuel ratio of each cylinder is greater than or equal to a specified value.

When the answer is NO in step 204, the computer determines that the current AFRDT is correct to end the routine. When the answer is YES in step 204, the procedure proceeds to step 205 in which the computer determines that the AFRDT deviates. A deviation-determination flag is set to "1".

[AFRDT Deviation Correction Routine]

Figure 6:
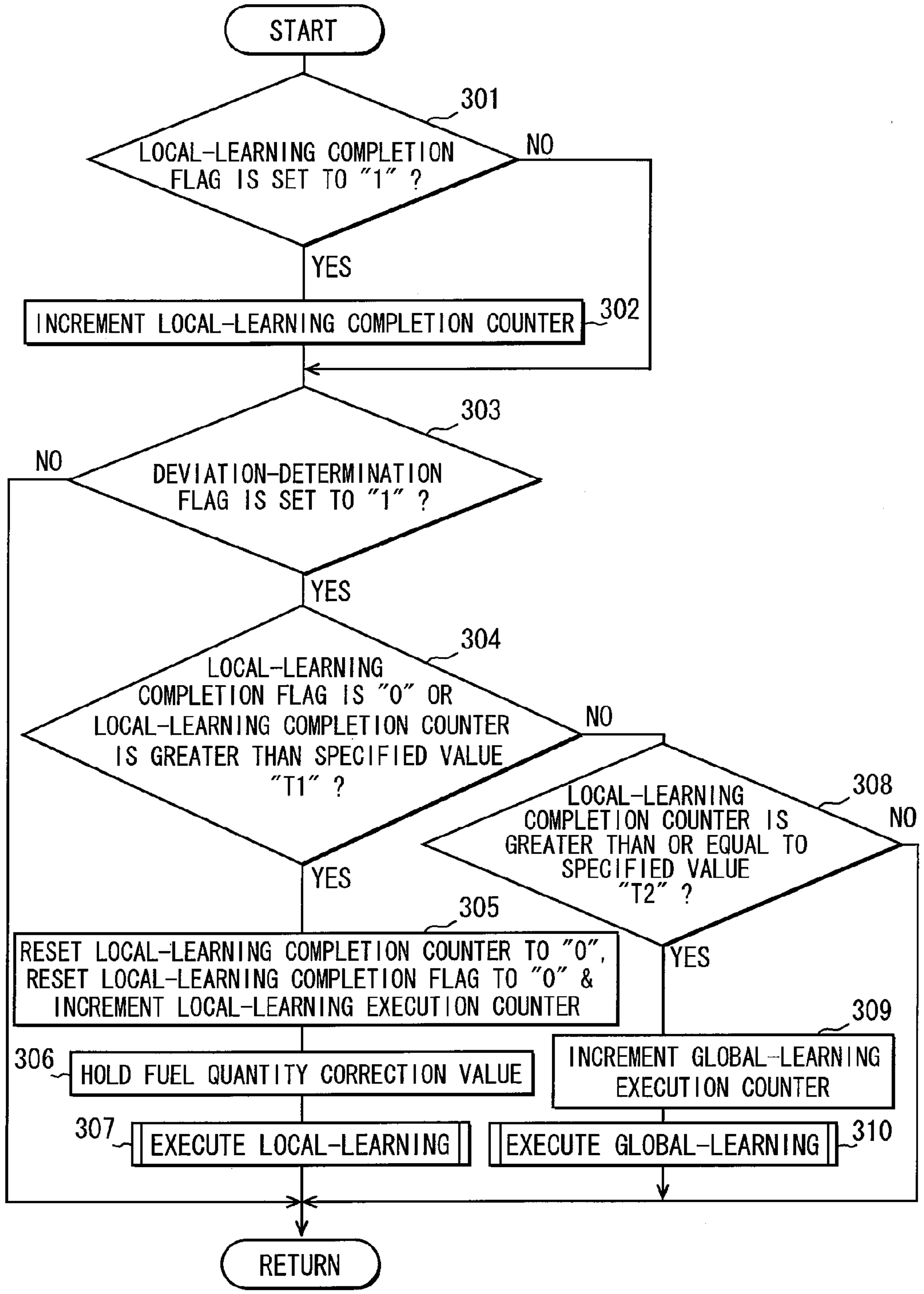
FIG. 6 is a flow chart showing a processing of an air-fuel ratio detecting time deviation correction routine.

An AFRDT deviation correction routine shown in FIG. 6 is executed in synchronization with an output pulse of the crank angle sensor 33. In step 301, the computer determines whether a Local-learning completion flag is set to "1". When the answer is YES, the procedure proceeds to step 302 in which a Local-learning completion counter is incremented.

Then, the procedure proceeds to step 303 in which the computer determines whether the deviation-determination flag is set to "1". When the deviation-determination flag is set to "0", the routine ends.

When the computer determines that the deviation-determination flag is set to "1", the procedure proceeds to step 304 in which the computer determines whether the Local-learning completion flag is "0" or whether the counting value of the Local-learning completion counter is greater than a specified value "T1".

When the answer is YES in step 304, the procedure proceeds to step 305 in which the Local-learning completion counter is reset to "0", the Local-learning completion flag is reset to "0", and a Local-learning execution counter is incremented.

Figure 7:
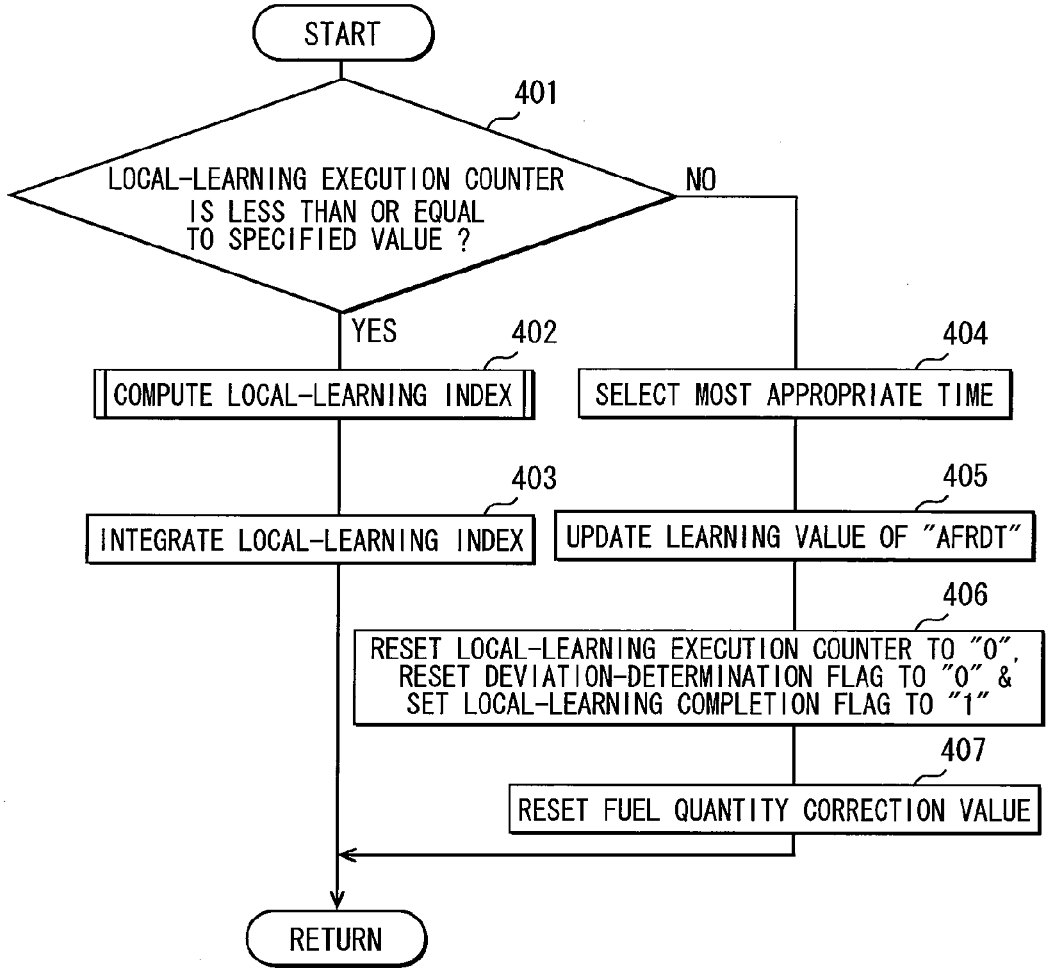
FIG. 7 is a flow chart showing a processing of a Local-learning routine according to the first embodiment.

Then, the procedure proceeds to step 306 in which the fuel quantity correction value of each cylinder is held at current value. Then, in step 307, a Local-learning routine shown in FIG. 7 is executed, whereby the Local-learning is executed. In the Local-learning, the AFRDT is corrected so that the dispersion of the detection values of the air fuel ratio sensor 36 becomes a maximum value in one cycle of the engine 11.

Meanwhile, when the answer is NO in step 304, the procedure proceeds to step 308 in which the computer determines whether a count value of the Local-learning completion counter is greater than or equal to the specified value "T2". It should be noted that the specified value "T2" is smaller than the specified value "T1" (T2<T1).

When the answer is NO in step 308, the computer determines that a sufficient time has not elapsed after the Local-learning is completed for stabilizing the cylinder-by-cylinder air-fuel ratio control. The routine ends.

Figure 9:
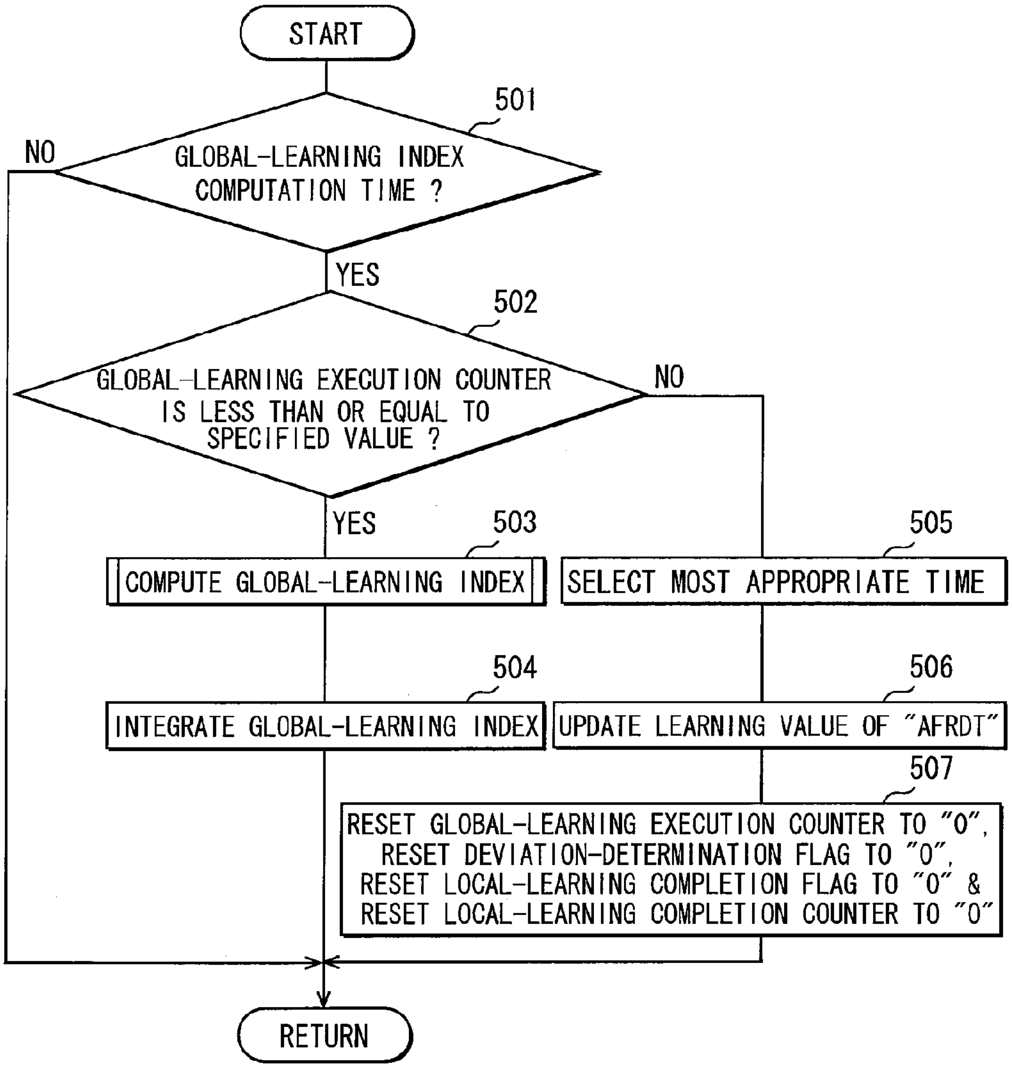
FIG. 9 is a flow chart showing a processing of a Global-learning routine according to the first embodiment.

When the answer is YES in step 308, the computer determines that a sufficient time has elapsed after the Local-learning is completed for stabilizing the cylinder-by-cylinder air-fuel ratio control. The procedure proceeds to step 309 in which the Global-learning execution counter is incremented. In step 310, the Global-learning routine shown in FIG. 9 is executed to execute the Global-learning in which the AFRDT is corrected based on the relationship between the variation of the estimated air fuel ratio of each cylinder and the variation of the fuel quantity correction value.

[Local-Learning Routine]

The Local-learning routine shown in FIG. 7 is a subroutine executed in step 307 of the AFRDT deviation correction routine shown in FIG. 6. This Local-learning routine functions as a first time-correction portion.

In the Local-learning routine, the Local-learning is executed. The AFRDT is corrected so that the dispersion of the detection values of the air fuel ratio sensor 36 becomes a maximum value in one cycle of the engine 11. In the Local-learning, the AFRDT is corrected so that a value corresponding to a distribution of the detection values of the air fuel ratio sensor 36 detected at every AFRDT becomes a maximum value.

In step 401, the computer determines whether the counting value of the Local-learning execution counter is less than or equal to a specified value, which is a value corresponding to 30 cycles, for example.

Figure 8:
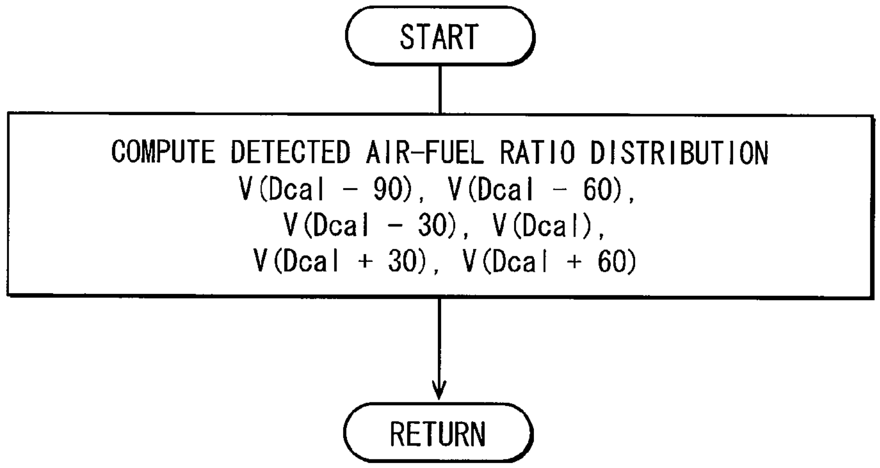
FIG. 8 is a flow chart showing a processing of a Local-learning index computation routine according to the first embodiment.

When the answer is YES in step 401, the procedure proceeds to step 402 in which a Local-learning index computation routine shown in FIG. 8 is executed. In this routine, with respect to cases where the AFRDT of the first cylinder #1 is assumed as following time "L1" to "L6" CA degree, a value corresponding to a distribution of the detection values of the air fuel ratio sensor 36 detected at every AFRDT is computed. This computed value is referred to as a detected air-fuel ratio distribution. The detected air-fuel ratio distribution is defined as a Local-learning index.

(1) When it is assumed that the AFRDT of first cylinder #1 is defined as a first time L1 (=Dcal−90), a detected air-fuel ratio distribution V (Dcal−90) is computed according to a following equation (4):

$$V(Dcal-90)=\frac{1}{N}\times\sum_{i=1}^{N}\{\phi(Dcal-90+720/N\times(i-1))-\text{Mean }\phi(Dcal-90)\}^2$$

"Dcal−90" represents a time point which advances by 90 CA degree from a current AFRDT "Dcal" of the first cylinder #1.

"N" represents a number of cylinders per one air-fuel ratio sensor 36 (for example, four). "ϕ(k)" represents a detection value of the air-fuel ratio sensor 36 at a crank angle "k" degree. Mean ϕ(k) represents an average value of ϕ(k), ϕ(k+720/N×1), ϕ(k+720/N×2), and ϕ(k+720/N×3). It should be noted that ϕ(k) is represented by an equivalence ratio (inverse number of an excess air ratio).

(2) When it is assumed that the AFRDT of first cylinder #1 is defined as a second timing L2 (=Dcal−60), a detected air-fuel ratio distribution V(Dcal−60) is computed according to a following equation (5):

$$V(Dcal-60)=\frac{1}{N}\times\sum_{i=1}^{N}\{\phi(Dcal-60+720/N\times(i-1))-\text{Mean }\phi(Dcal-60)\}^2$$

"Dcal−60" represents a time point which advances by 60 CA degree from a current AFRDT "Dcal" of the first cylinder #1.

(3) When it is assumed that the AFRDT of first cylinder #1 is defined as a third timing L3 (=Dcal−30), a detected air-fuel ratio distribution V(Dcal−30) is computed according to a following equation (6):

$$V(Dcal-30)=\frac{1}{N}\times\sum_{i=1}^{N}\{\phi(Dcal-30+720/N\times(i-1))-\text{Mean }\phi(Dcal-30)\}^2$$

"Dcal−30" represents a time point which advances by 30 CA degree from a current AFRDT "Dcal" of the first cylinder #1.

(4) When it is assumed that the AFRDT of first cylinder #1 is defined as a fourth timing L4 (=Dcal), a detected air-fuel ratio distribution V(Dcal) is computed according to a following equation (7):

$$V(Dcal)=\frac{1}{N}\times\sum_{i=1}^{N}\{\phi(Dcal+720/N\times(i-1))-\text{Mean }\phi(Dcal)\}^2$$

(5) When it is assumed that the AFRDT of first cylinder #1 is defined as a fifth timing L5 (=Dcal+30), a detected air-fuel ratio distribution V(Dcal+30) is computed according to a following formula (8):

"Dcal+30" represents a time point which retards by 30 CA degree from a current AFRDT "Dcal" of the first cylinder #1.

(6) When it is assumed that the AFRDT of first cylinder #1 is defined as a sixth timing L6 (=Dcal+60), a detected air-fuel ratio distribution V(Dcal+60) is computed according to a following formula (9):

$$V(Dcal+60)=\frac{1}{N}\times\sum_{i=1}^{N}\{\phi(Dcal+60+720/N\times(i-1))-\text{Mean }\phi(Dcal+60)\}^2$$

"Dcal+60" represents a time point which retards by 60 CA degree from a current AFRDT "Dcal" of the first cylinder #1.

As described above, with respect to each case where the AFRDT of the first cylinder #1 is assumed as time "L1" to "L6" CA degree, the each detected air-fuel ratio distribution V(Local-learning index) is computed. Then, the procedure proceeds to step 403 in which the integrated value of detected air-fuel ratio distribution V is multiplied by newly obtained detected air-fuel ratio distribution V so that the integrated value of detected air-fuel ratio distribution V is updated.

When the computer determines that the counting value of the Local-learning execution counter has exceeded the specified value in step 401, the computer determines that the integrated value of the detected air-fuel ratio distribution V is computed for specified time period. The procedure proceeds to step 404. In step 404, a time at which the integrated value of the detected air-fuel ratio distribution V becomes a maximum value is selected as the most appropriated time.

Then, the procedure proceeds to step 405 in which the selected most appropriated time is learned as the AFRDT of first cylinder #1 and the AFRDTs of other cylinders (the second cylinder #2-the fourth cylinder #4) are learned on the basis of the AFRDT of the first cylinder #1. These learning values are stored in a storage area of a rewritable nonvolatile memory of backup RAM of ECU 39.

Then, the procedure proceeds to step 406 in which the Local-learning execution counter is reset to "0", the deviation-determination flag is reset to "0", and the Local-learning completion flag is set to "1". Then, the procedure proceeds to step 407 in which the fuel quantity correction value of each cylinder is reset to a specified value (for example, an initial value) to end the routine.

[Global-Learning Routine]

A Global-learning routine shown in FIG. 9 is a subroutine executed in step 310 of the AFRDT deviation correction routine shown in FIG. 6. This Global-learning routine functions as a second time-correction portion.

In this routine, the Global-learning is executed. In the Global-learning, the AFRDT is corrected based on the relationship between the variation of the estimated air fuel ratio of each cylinder and the variation of the correction value (fuel quantity correction value) of each cylinder. In the Global-learning, the cylinder corresponding to the estimated air fuel ratio is hypothetically varied from the cylinder #1 to the cylinder #4. With respect to each case, a correlation coefficient between the variation of the estimated air fuel ratio and the variation of the correction value (fuel quantity correction value) is computed. Then, the AFRDT is corrected so that this correlation coefficient becomes a maximum value.

In step 501, the computer determines whether it is a Global-leaning index computation time (for example, 720 CA degree). When the answer is No in step 501, the procedure ends without performing the subsequent steps.

When the answer is YES in step 501, the procedure proceeds to step 502 in which the computer determines whether the counting value of a Global-learning execution counter is less than or equal to a specified value, which is a value corresponding to 30 cycles, for example.

Figure 10:
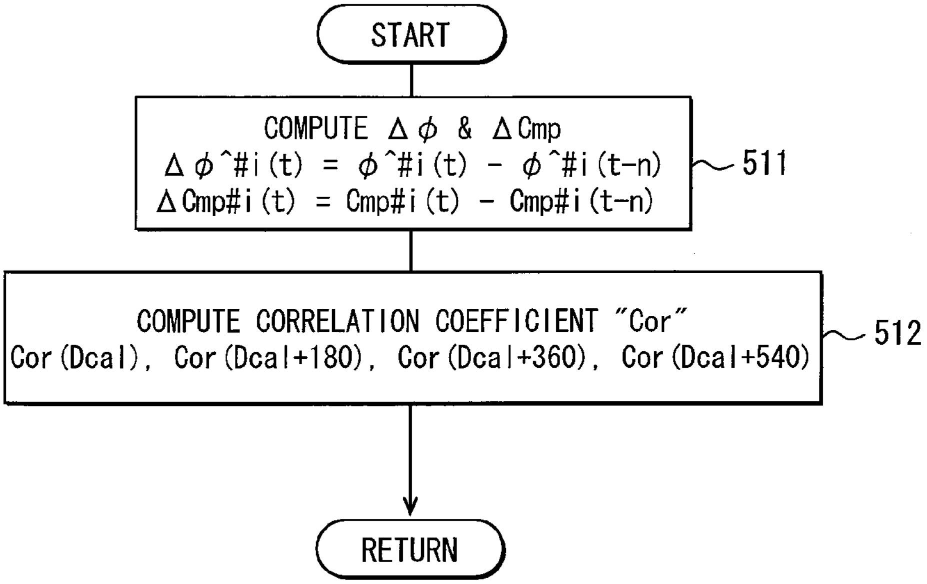
FIG. 10 is a flow chart showing a processing of a Global-learning index computation routine according to the first embodiment.

When the computer determines that the counting value of the Global-learning execution counter is less than or equal to a specified value in step 502, the procedure proceeds to step 503 in which a Global-learning index computation routine shown in FIG. 10 is executed. With respect to each case where the AFRDT of the first cylinder #1 is assumed as time G1 to G4 (CA degree), a correlation coefficient between the variation of the estimated air fuel ratio of each cylinder and a variation of the fuel quantity correction value is computed. The computed correlation coefficient is defined as a Global-learning index.

Specifically, in step 511, the computer computes a variation Δϕ of the estimated air fuel ratio of each cylinder and a variation ΔCmp of the fuel quantity correction value at a time of the current AFRDT, based on the following formula:

$$\Delta\phi\hat{}\#i(t)=\phi\hat{}\#i(t)-\phi\hat{}\#i(t-n)$$

$$\Delta Cmp\#i(t)=Cmp\#i(t)-Cmp\#i(t-n)$$

It should be noted that ϕ^#i(t) represents a currently estimated air fuel ratio of i-th cylinder #i, and ϕ^#i(t−n) is an estimated air fuel ratio of i-th cylinder estimated "n" times before. Further, Cmp#i(t) represents a currently computed fuel quantity correction value of i-th cylinder #i. Cmp#i(t−n) is a fuel quantity correction value of i-th cylinder computed "n" times before. In addition, "n" is an integer value which is greater than or equal to "1".

Then, the procedure proceeds to step 512. In step 512, with respect to each case where the AFRDT of the first cylinder #1 is assumed as time "G1" to "G4", a correlation coefficient between the variation of the estimated air fuel ratio of each cylinder and the variation of the fuel quantity correction value of each cylinder. The correlation coefficient corresponds to a sum of the product of variation Δϕ and the variation ΔCmp.

(1) When it is assumed that the AFRDT of the first cylinder #1 is defined as the first time G1 (=Dcal), as shown in a portion (a) of FIG. 11, an estimated air fuel ratio ϕ^#1 of the first cylinder #1 at the current AFRDT is computed as an estimated air fuel ratio of the first cylinder #1, an estimated air fuel ratio ϕ^#3 of the third cylinder #3 at the current AFRDT is computed as an estimated air fuel ratio of the third cylinder #3, an estimated air fuel ratio ϕ^#4 of the fourth cylinder #4 at the current AFRDT is computed as an estimated air fuel ratio of the fourth cylinder #4, and an estimated air fuel ratio ϕ^#2 of the second cylinder #2 at the current AFRDT is computed as an estimated air fuel ratio of the second cylinder #2.

Therefore, when it is assumed that the AFRDT of the first cylinder #1 is the first time G1 (=Dcal), a correlation coefficient Cor(Dcal) can be computed according to following formula:

$$Cor(Dcal) = \Delta\varphi\hat{}\#1(t)\times\Delta Cmp\#1(t) + \Delta\varphi\hat{}\#3(t)\times\Delta Cmp\#3(t) + \Delta\varphi\hat{}\#4(t)\times\Delta Cmp\#4(t) + \Delta\varphi\hat{}\#2(t)\times\Delta Cmp\#2(t)$$

(2) When it is assumed that the AFRDT of the first cylinder #1 is defined as the second time G2 (=Dcal+180), as shown in a portion (b) of FIG. 11, an estimated air fuel ratio ϕ^#1 of the first cylinder #1 at the current AFRDT is computed as an estimated air fuel ratio of the second cylinder #2, an estimated air fuel ratio ϕ^#3 of the third cylinder #3 at the current AFRDT is computed as an estimated air fuel ratio of the first cylinder #1, an estimated air fuel ratio ϕ^#4 of the fourth cylinder #4 at the current AFRDT is computed as an estimated air fuel ratio of the third cylinder #3, and an estimated air fuel ratio ϕ^#2 of the second cylinder #2 at the current AFRDT is computed as an estimated air fuel ratio of the fourth cylinder #4.

Therefore, When it is assumed that the AFRDT of the first cylinder #1 is defined as the second time G2 (=Dcal+180), the correlation coefficient Cor(Dcal+180) can be computed according to the following formula:

$$Cor(Dcal+180) = \Delta\varphi\hat{}\#3(t)\times\Delta Cmp\#1(t) + \Delta\varphi\hat{}\#4(t)\times\Delta Cmp\#3(t) + \Delta\varphi\hat{}\#2(t)\times\Delta Cmp\#4(t) + \Delta\varphi\hat{}\#1(t)\times\Delta Cmp\#2(t)$$

(3) When it is assumed that the AFRDT of the first cylinder #1 is defined as the third time G3 (=Dcal+360), as shown in a portion (c) of FIG. 11, an estimated air fuel ratio ϕ^#1 of the first cylinder #1 at the current AFRDT is computed as an estimated air fuel ratio of the fourth cylinder #4, an estimated air fuel ratio ϕ^#3 of the third cylinder #3 at the current AFRDT is computed as an estimated air fuel ratio of the second cylinder #2, an estimated air fuel ratio ϕ^#4 of the fourth cylinder #4 at the current AFRDT is computed as an estimated air fuel ratio of the first cylinder #1, and an estimated air fuel ratio ϕ^#2 of the second cylinder #2 at the current AFRDT is computed as an estimated air fuel ratio of the third cylinder #3.

Therefore, when it is assumed that the AFRDT of the first cylinder #1 is the third time G3 (=Dcal+360), a correlation coefficient Cor(Dcal+360) can be computed according to a following formula:

$$Cor(Dcal+360) = \Delta\varphi\hat{}\#4(t)\times\Delta Cmp\#1(t) + \Delta\varphi\hat{}\#2(t)\times\Delta Cmp\#3(t) + \Delta\varphi\hat{}\#1(t)\times\Delta Cmp\#4(t) + \Delta\varphi\hat{}\#3(t)\times\Delta Cmp\#2(t)$$

(4) When it is assumed that the AFRDT of the first cylinder #1 is defined as the fourth time G4 (=Dcal+540), as shown in a portion (d) of FIG. 11, an estimated air fuel ratio ϕ^#1 of the first cylinder #1 at the current AFRDT is computed as an estimated air fuel ratio of the third cylinder #3, an estimated air fuel ratio ϕ^#3 of the third cylinder #3 at the current AFRDT is computed as an estimated air fuel ratio of the fourth cylinder #4, an estimated air fuel ratio ϕ^#4 of the fourth cylinder #4 at the current AFRDT is computed as an estimated air fuel ratio of the second cylinder #2, and an estimated air fuel ratio ϕ^#2 of the second cylinder #2 at the current AFRDT is computed as an estimated air fuel ratio of the first cylinder #1.

Therefore, when it is assumed that the AFRDT of the first cylinder #1 is the fourth time G4 (=Dcal+540), a correlation coefficient Cor(Dcal+540) can be computed according to a following formula:

$$Cor(Dcal+540) = \Delta\varphi\hat{}\#2(t)\times\Delta Cmp\#1(t) + \Delta\varphi\hat{}\#1(t)\times\Delta Cmp\#3(t) + \Delta\varphi\hat{}\#3(t)\times\Delta Cmp\#4(t) + \Delta\varphi\hat{}\#4(t)\times\Delta Cmp\#2(t)$$

As described above, with respect to each case where the AFRDT of the first cylinder #1 is assumed as the time "G1" to "G4", the correlation coefficient Cor(Global-learning index) between the variation of the estimated air fuel ratio of each cylinder and the variation of the fuel quantity correction value of each cylinder is computed. Then, the procedure proceeds to step 504 in which the integrated value of the correlation coefficient Cor is multiplied by newly obtained correlation coefficient Cor so that the integrated value of the correlation coefficient Cor is updated. At this time, only the plus values of the correlation coefficient Cor may be integrated. Alternatively, only the minus value of the correlation coefficient Cor may be integrated.

When the computer determines that the counting value of the Global-learning execution counter has exceeded the specified value in step 502, the computer determines that the correlation coefficient Cor is computed for specified time period. The procedure proceeds to step 505. In step 505, a time at which the integrated value of the correlation coefficient Cor becomes a maximum value is selected as the most appropriated time.

Then, the procedure proceeds to step 506 in which the selected most appropriated time is learned as the AFRDT of first cylinder #1 and the AFRDTs of other cylinders (the second cylinder #2-the fourth cylinder #4) are learned on the basis of the AFRDT of the first cylinder #1. These learning values are stored in a storage area of a rewritable nonvolatile memory of backup RAM of ECU 39.

Then, the procedure proceeds to step 507 in which the counting value of the Global-learning execution counter is reset to “0”, the deviation-determination flag is reset to “0”, the Local-learning completion flag is reset to “0”, and the counting value of the Local-learning completion counter is reset to “0”.

Besides, in a period after the Local-learning is completed until the Global-learning is completed, a feedback gain of the cylinder-by-cylinder air-fuel ratio control may be increased. In this case, the feedback gain may be increased with respect to specified cylinder. Alternatively, the feedback gain may be set different between cylinders.

Figure 12:
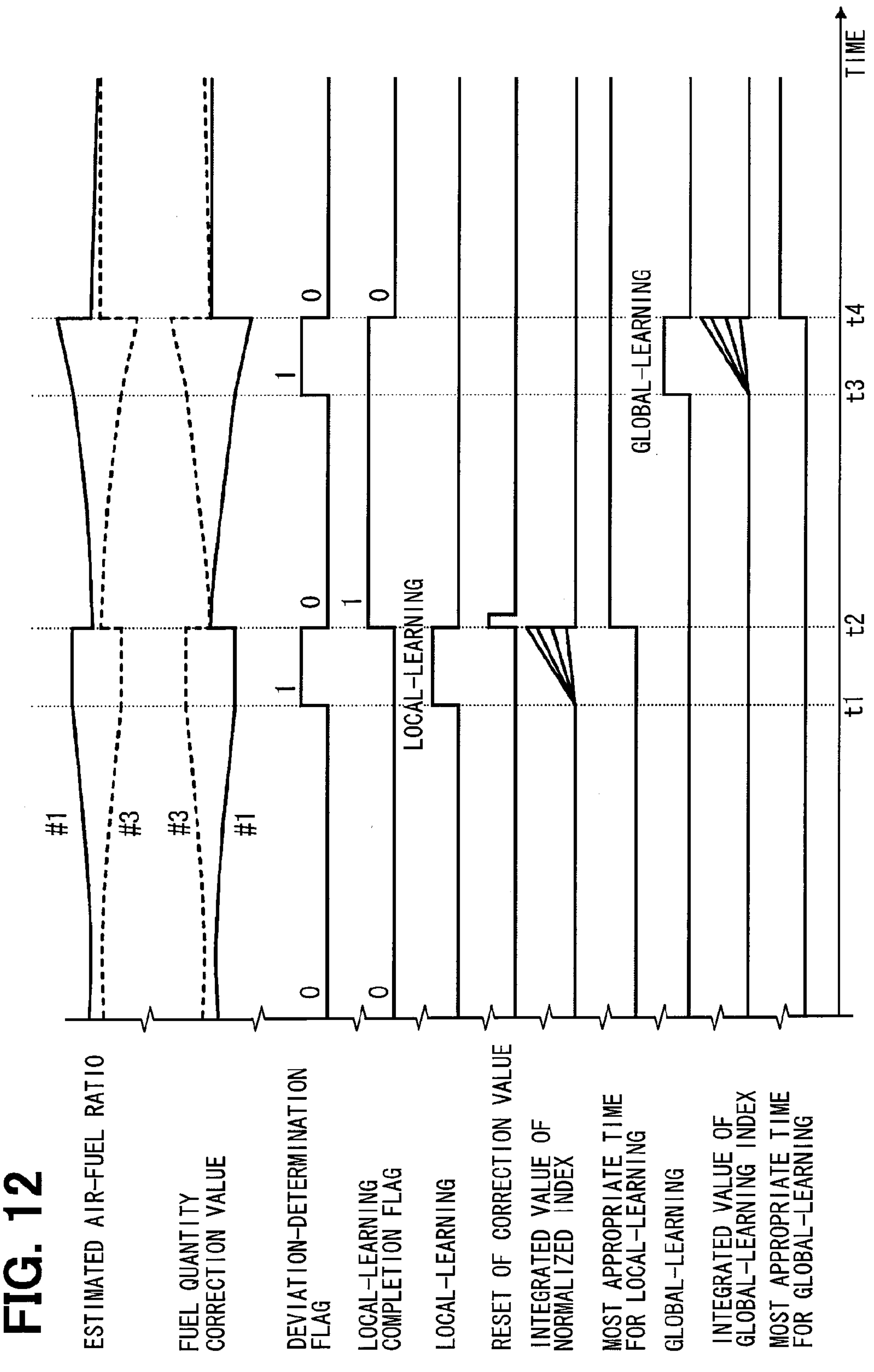
FIG. 12 is a time chart showing the air-fuel ratio detecting time deviation correction according to the first embodiment.

Referring to FIG. 12, an example of execution of a deviation learning correction of the AFRDT will be described.

While the cylinder-by-cylinder air-fuel ratio control is executed, the computer determines whether the AFRDT deviates based on the estimated air fuel ratio of each cylinder, and the fuel quantity correction value. When the computer determines that the AFRDT deviates and the deviation-determination flag is set to “1” at a time “t1”, the fuel quantity correction value of each cylinder is held at current value and the Local-learning is executed. In the Local-learning, the AFRDT is corrected so that the dispersion of the detection values of the air fuel ratio sensor 36 becomes a maximum value in one cycle of the engine 11. In the Local-learning, the AFRDT is corrected so that a value corresponding to a distribution of the detection values of the air fuel ratio sensor 36 detected at every AFRDT becomes a maximum value.

Specifically, with respect to each case where the AFRDT of the first cylinder #1 is assumed as time “L1” to “L6” CA degree, the computer computes the integrated value of the detected air-fuel ratio distribution V(Local-learning index) for specified time period. The time at which the integrated value of the detected air-fuel ratio distribution V becomes a maximum value is selected and learned as the most appropriated time.

When the Local-learning is completed at a time “t2”, the deviation-determination flag is reset to “0”, the Local-learning completion flag is set to “1”, and the correction value (fuel correction quantity value) of each cylinder is reset to a specified value (for example, an initial value).

After that, when the computer determines that the AFRDT deviates again and the deviation-determination flag is set to “1” at a time “t3”, the computer executes the Global-learning in which the AFRDT is corrected based on the relationship between the variation of the estimated air fuel ratio of each cylinder and the variation of the fuel quantity correction value. In the Global-learning, the cylinder corresponding to the estimated air fuel ratio is hypothetically varied from the cylinder #1 to the cylinder #4. With respect to each case, a correlation coefficient between the variation of the estimated air fuel ratio and the variation of the correction value (fuel quantity correction value) is computed. Then, the AFRDT is corrected so that this correlation coefficient becomes a maximum value.

Specifically, with respect to each case where the AFRDT of the first cylinder #1 is assumed as time “G1” to “G4” CA degree, the computer computes an integrated value of the correlation coefficient Cor(Global-learning index) between the variation of the estimated air fuel ratio of each cylinder and the variation of the fuel quantity correction value of each cylinder is computed. One of the times “G1” to “G4” at which the integrated value of the correlation coefficient Cor becomes a maximum value is selected and learned as the most appropriate time.

When the Global-learning is completed at a time “t4”, the deviation-determination flag is reset to “0” and the Local-learning completion flag is reset to “0.”

According to the first embodiment described above, the computer executes the Local-learning in which the AFRDT is corrected so that the dispersion of the detection values of the air fuel ratio sensor 36 becomes a maximum value in one cycle of the engine 11. Further, the computer executes the Global-learning in which the AFRDT is corrected based on the relationship between the variation of the estimated air fuel ratio of each cylinder and the variation of the fuel quantity correction value. Thus, the deviation of the AFRDT can be corrected with high accuracy. Furthermore, in the Global-learning, the cylinder corresponding to the estimated air fuel ratio is hypothetically varied from the cylinder #1 to the cylinder #4. With respect to each case, a correlation coefficient between the variation of the estimated air fuel ratio and the variation of the correction value (fuel quantity correction value) is computed. Then, the AFRDT is corrected so that this correlation coefficient becomes a maximum value. Therefore, it is unnecessary to actually vary the current AFRDT sequentially to compute the correlation coefficient. The deviation of the AFRDT can be corrected in a short period.

Furthermore, since the Global-learning is executed after the Local-learning, a calculation accuracy of the correlation coefficient in a Global-learning can be enhanced and a correction accuracy of the deviation of the AFRDT can be enhanced.

In the Local-learning, the AFRDT is corrected so that a value corresponding to the distribution V of the detection values of the air fuel ratio sensor 36 detected at every AFRDT becomes a maximum value. Thus, the dispersion of the actual air fuel ratio of each cylinder (dispersion in detection value of the air fuel ratio sensor 36) can be detected appropriately and the AFRDT can be corrected.

Further, in the Local-learning, since the AFRDT is corrected so that the integrated value of the value corresponding to a distribution (detected air-fuel ratio distribution V) becomes a maximum value, influences of noises and disturbances can be reduced and the correction accuracy of the AFRDT by a Local-learning can be improved.

In the Global-learning, the sum of the product of the variation of the estimated air fuel ratio of each cylinder and the variation of the correction value of each cylinder is computed as the correlation coefficient Cor, and then the AFRDT is corrected so that this correlation coefficient Cor becomes a maximum value. Thus, the deviation of the AFRDT can be evaluated quantitatively so that the AFRDT can be corrected.

Further, in the Local-learning, since the AFRDT is corrected so that the integrated value of the value corresponding to a distribution (detected air-fuel ratio distribution V) becomes a maximum value, influences of noises and disturbances can be reduced and the correction accuracy of the AFRDT by the Global-learning can be improved.

Second Embodiment

Figure 13:
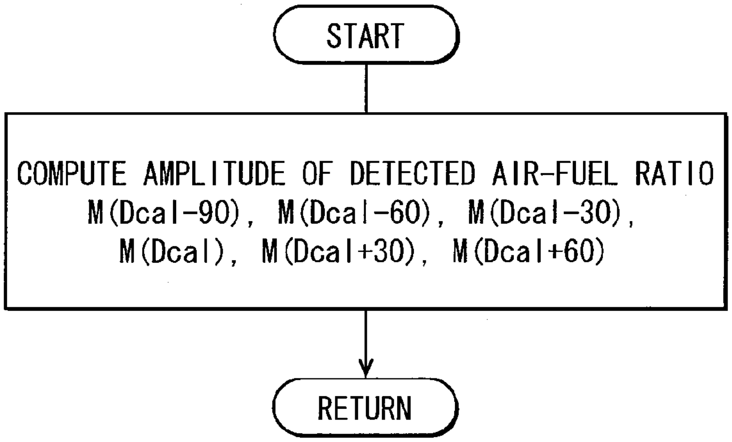
FIG. 13 is a flow chart showing a processing of a Local-learning index computation routine according to a second embodiment.

Referring to FIG. 13, a second embodiment will be described hereinafter. In the following embodiments, the same parts and components as those in the first embodiment are indicated with the same reference numerals and the same descriptions will not be reiterated.

In the first embodiment, the detected air-fuel ratio distribution is computed as the Local-learning index by executing the local-learning index computation routine shown in FIG.

8. According to the second embodiment, a Local-learning index computation routine shown in FIG. 13 is executed. With respect to each case where the AFRDT of the first cylinder #1 is assumed as time L1 to L6, an amplitude of the detection values of the air-fuel ratio sensor 36 is computed for each cylinder. The amplitude of the detected air-fuel ratio is defined as a Local-learning index.

(1) When it is assumed that the AFRDT of the first cylinder #1 is the first time L1 (=Dcal−90), an amplitude M(Dcal−90) of the detected air-fuel ratio is computed according to a following formula:

$$M(\text{Dcal}-90)=\text{Max}\ \phi(\text{Dcal}-90)-\text{Min}\ \phi(\text{Dcal}-90)$$

wherein Max φ(k) represents a maximum value among φ(k), φ(k+720/N×1), φ(k+720/N×2) and φ(k+720/N×3), and Min φ(k) represents a minimum value among φ(k), φ(k+720/N×1), φ(k+720/N×2) and φ(k+720/N×3).

(2) When it is assumed that the AFRDT of the first cylinder #1 is the second time L2 (=Dcal−60), an amplitude M(Dcal−60) of the detected air-fuel ratio is computed according to a following formula:

$$M(\text{Dcal}-60)=\text{Max}\ \phi(\text{Dcal}-60)-\text{Min}\ \phi(\text{Dcal}-60)$$

(3) When it is assumed that the AFRDT of the first cylinder #1 is the third time L2 (=Dcal−30), an amplitude M(Dcal−30) of the detected air-fuel ratio is computed according to a following formula:

$$M(\text{Dcal}-30)=\text{Max}\ \phi(\text{Dcal}-30)-\text{Min}\ \phi(\text{Dcal}-30)$$

(4) When it is assumed that the AFRDT of the first cylinder #1 is the fourth time L4 (=Dcal), an amplitude M(Dcal) of the detected air-fuel ratio is computed according to a following formula:

$$M(\text{Dcal})=\text{Max}\ \phi(\text{Dcal})-\text{Min}\ \phi(\text{Dcal})$$

(5) When it is assumed that the AFRDT of the first cylinder #1 is the fifth time L5 (=Dcal+30), an amplitude M(Dcal+30) of the detected air-fuel ratio is computed according to a following formula:

$$M(\text{Dcal}+30)=\text{Max}\ \phi(\text{Dcal}+30)-\text{Min}\ \phi(\text{Dcal}+30)$$

(6) When it is assumed that the AFRDT of the first cylinder #1 is the sixth time L6 (=Dcal+60), an amplitude M(Dcal+60) of the detected air-fuel ratio is computed according to a following formula:

$$M(\text{Dcal}+60)=\text{Max}\ \phi(\text{Dcal}+60)-\text{Min}\ \phi(\text{Dcal}+60)$$

As described above, with respect to each case where the AFRDT of the first cylinder #1 is assumed as a time "L1" to "L6" CA degree, the each amplitude M(Local-learning index) is computed. Then, the procedure proceeds to step 403 in which the integrated value of the amplitude M is multiplied by newly obtained amplitude M so that the integrated value of amplitude M is updated.

When the computer determines that the counting value of the Local-learning execution counter has exceeded the specified value, the computer determines that the integrated value of the amplitude M is computed for specified time period. The procedure proceeds to step 404. In step 404, a time at which the integrated value of the amplitude M becomes a maximum value is selected as the most appropriated time.

Then, the procedure proceeds to step 405 in which the selected most appropriated time is learned as the AFRDT of first cylinder #1 and the AFRDTs of other cylinders (the second cylinder #2-the fourth cylinder #4) are learned on the basis of the AFRDT of the first cylinder #1. These learning values are stored in a storage area of a rewritable nonvolatile memory of backup RAM of ECU 39.

According to the second embodiment, substantially the same advantage can be achieved as the first embodiment.

Third Embodiment

Referring to FIGS. 14 to 20, a third embodiment will be described hereinafter. In the third embodiment, the same parts and components as those in the first embodiment are indicated with the same reference numerals and the same descriptions will not be reiterated.

Figure 15:
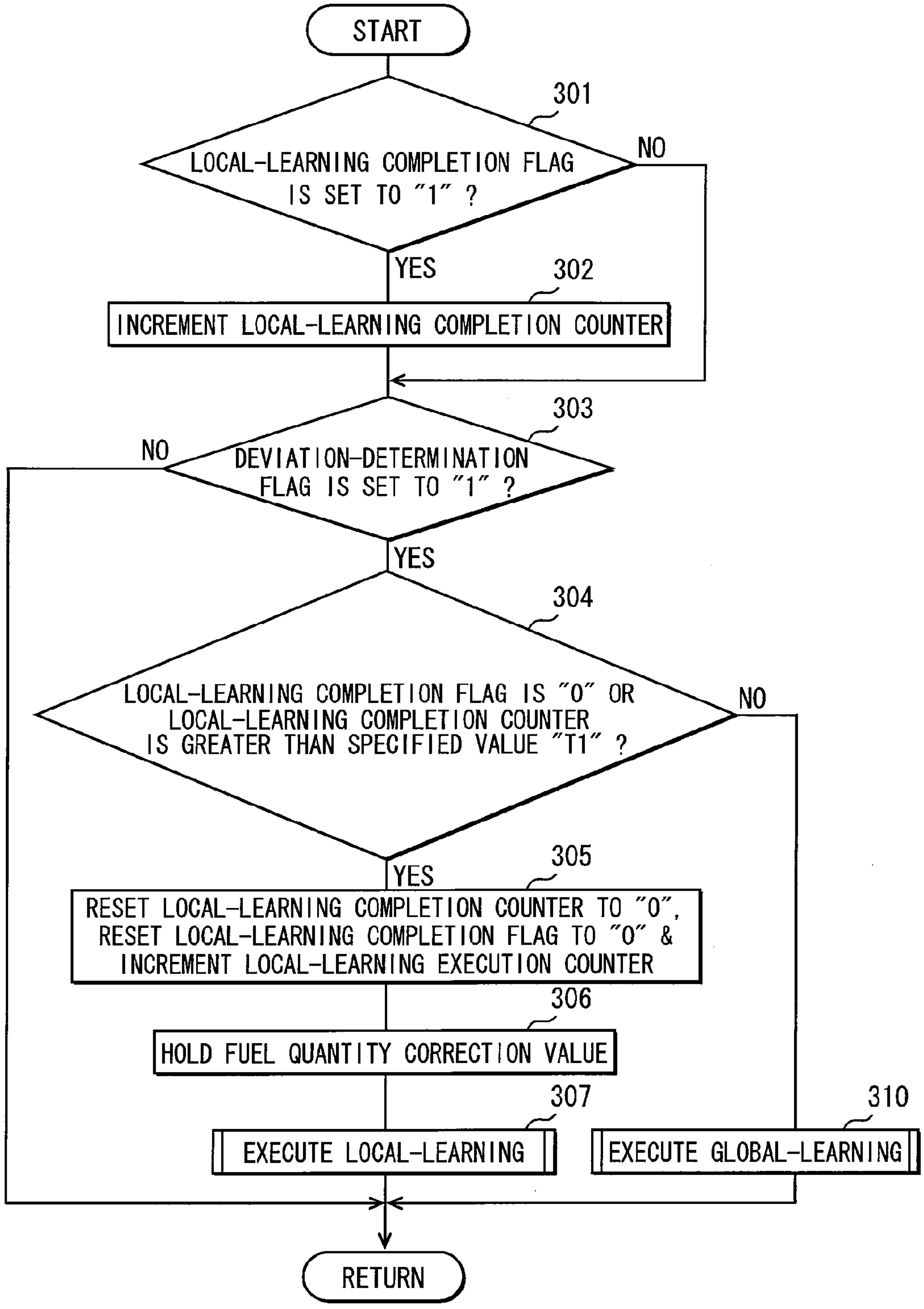
FIG. 15 is a flow chart showing a processing of an air-fuel ratio detecting time deviation correction routine according to the third embodiment.
Figure 16:
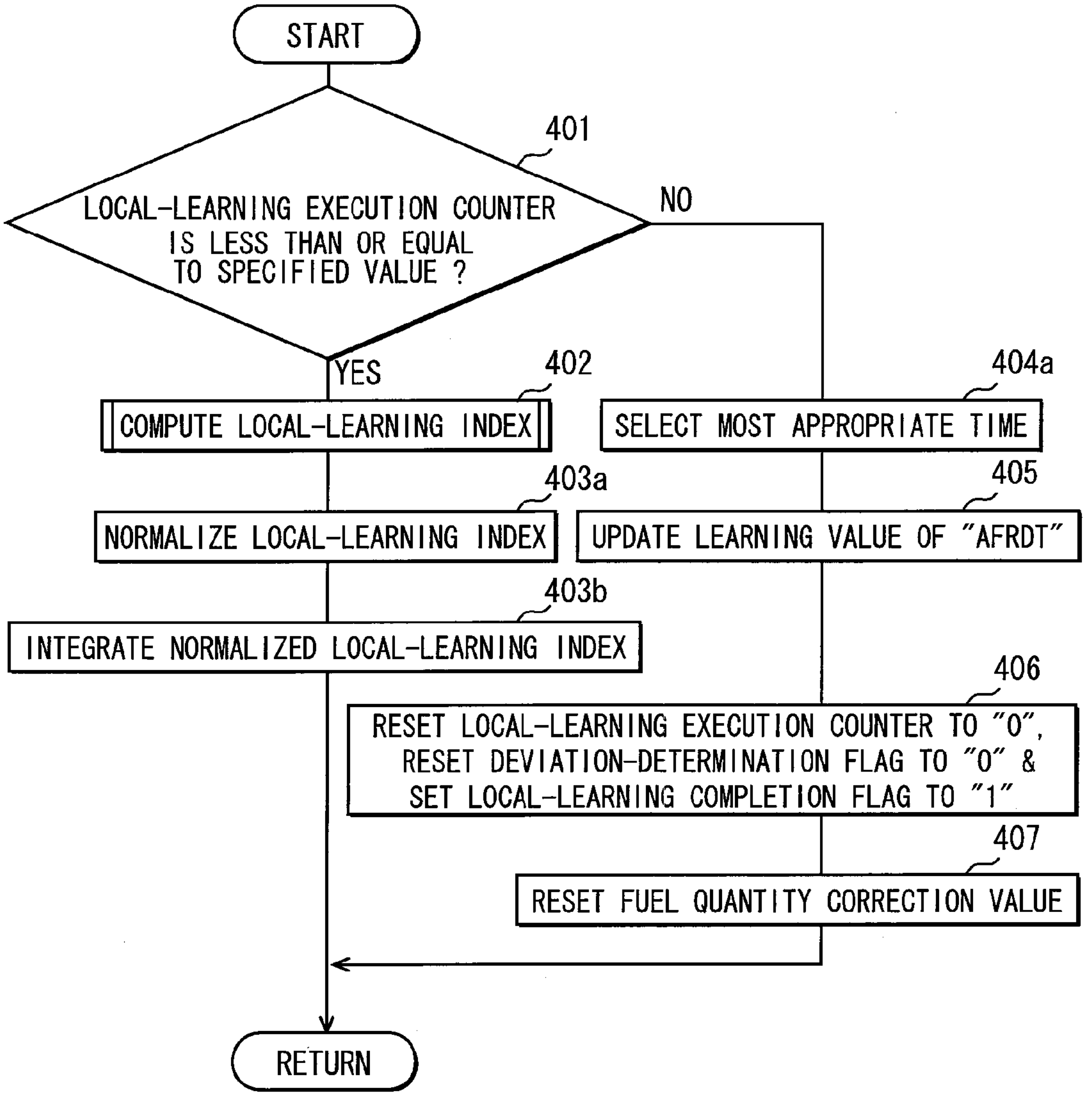
FIG. 16 is a flow chart showing a processing of a Local-learning routine according to the third embodiment.
Figure 17:
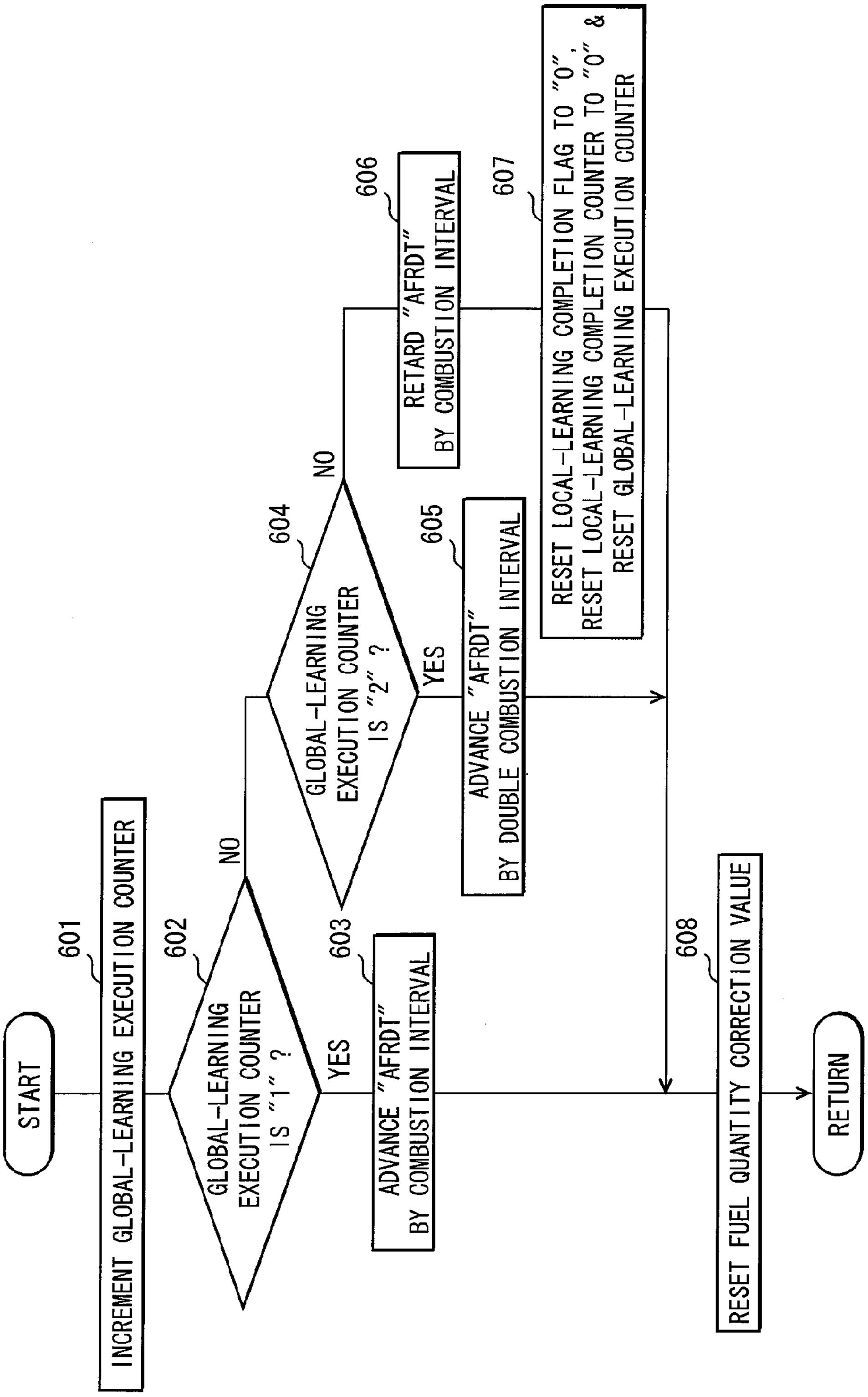
FIG. 17 is a flow chart showing a processing of a Global-learning routine according to the third embodiment.

According to the third embodiment, the ECU 39 executes each of routines shown in FIGS. 15 to 17, whereby a Local-learning and a Global-learning are executed. In the Local-learning, the AFRDT is corrected so that the dispersion of the detection values of the air fuel ratio sensor 36 becomes a maximum value in one cycle (720 CA degree) of the engine 11. After the Local-learning is executed, the Global-learning is executed. In the Global-learning, the AFRDT is corrected by a combustion interval of the engine (for example, 180 CA degree). Alternatively, the AFRDT is multiplied twice or more.

By executing the Local-learning, the AFRDT is corrected so that the dispersion of the detection values of the air fuel ratio sensor 36 becomes a maximum value in one cycle (720 CA degree) of the engine 11. Thereby, any of the detection values of the air fuel ratio sensor 36 detected at the AFRDT of each cylinder represents the actual air fuel ratio. That is, the correct AFRDT of each cylinder is the current AFRDT of any one of the cylinders. After that, when the computer determines that the AFRDT deviates, the Global-learning is executed to correct the AFRDT. The AFRDT of each cylinder is replaced by the AFRDT of other cylinders. The AFRDT of each cylinder can be corrected to the correct AFRDT. The deviation of the AFRDT can be corrected with high accuracy in a short time.

When the computer determines that the AFRDT deviates after the execution of the Local-learning, it can be considered that the correct AFRDT of each cylinder is the current AFRDT of the successive combustion cylinder rather than the case where the correct AFRDT of each cylinder is the current AFRDT of a cylinder other than the successive combustion cylinder.

According to the third embodiment, when the computer determines that the AFRDT deviates after the execution of the Local-learning, the Global-learning is executed to correct the AFRDT. In the Global-learning, the AFRDT of each cylinder is corrected to the AFRDT of the successive combustion cylinder. After that, the AFRDT of each cylinder is corrected to the AFRDT of a cylinder other than the successive combustion cylinder.

Figure 14:
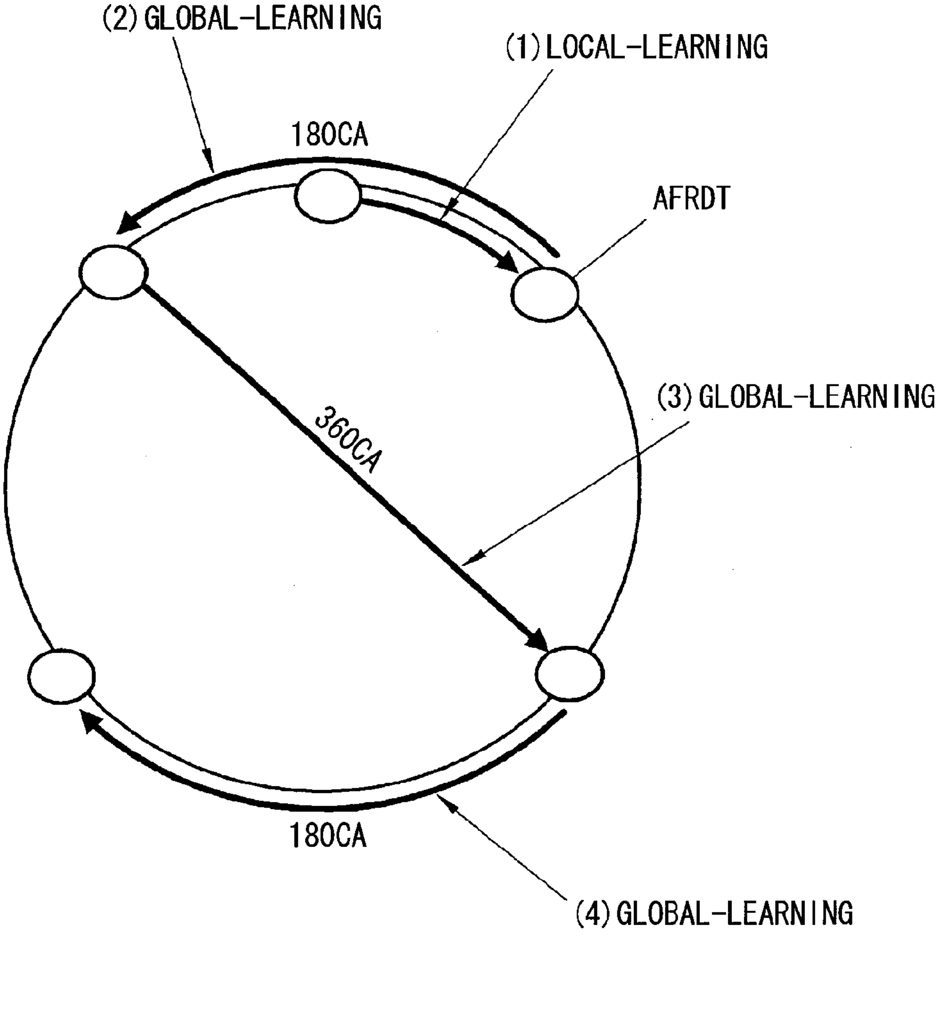
FIG. 14 is a chart for explaining a Global-learning according to a third embodiment.

Specifically, as shown (1) in FIG. 14, when the computer determines that the AFRDT deviates, the Local-learning is executed so that the correct AFRDT of each cylinder is a current AFRDT of any one of the cylinders.

(2) When the computer determines that the AFRDT deviates after the Local-learning was executed once, the Global-learning is executed to advance the AFRDT of each cylinder by a combustion interval (for example, 180 CA degree). The AFRDT of each cylinder is corrected to the AFRDT of the successive combustion cylinder which is advanced relative to the AFRDT of right after the Local-learning.

(3) When the computer determines that the AFRDT deviates after the Local-learning was executed twice, the Global-learning is executed to advance the AFRDT of each cylinder by a double combustion interval (for example, 360 CA degree). The AFRDT of each cylinder is corrected to the AFRDT of the successive combustion cylinder which is retarded relative to the AFRDT of right after the Local-learning.

(4) When the computer determines that the AFRDT deviates after the Local-learning was executed three times, the Global-learning is executed to retard the AFRDT of each cylinder by a combustion interval (for example, 180 CA degree). The AFRDT of each cylinder is corrected to the AFRDT of a cylinder other than the successive combustion cylinder relative to the AFRDT of right after the Local-learning.

When the computer determines that the AFRDT deviates even though the AFRDT is corrected by a value corresponding to one cycle in the Global-learning, the Local-learning is executed again.

In the above first embodiment, the AFRDT is corrected so that the integrated value of the detected air-fuel ratio distribution V becomes a maximum value in the Local-learning. According to the third embodiment, in the Local-learning, the AFRDT is corrected so that the integrated value of the data corresponding to a normalized detected air-fuel ratio distribution V becomes a maximum value, Referring to FIGS. 15 to 17, a processing of each routine which the ECU 39 executes will be described hereinafter.

[AFRDT Deviation Correction Routine]

An AFRDT deviation correction routine shown in FIG. 15 is different from the routine shown in FIG. 6 only in that the routine shown in FIG. 15 does not include steps 308 and 309. The other steps in FIG. 16 are the same as those in FIG. 6.

In step 301, the computer determines whether the Local-learning completion flag is set to "1". When the answer is YES, the procedure proceeds to step 302 in which the Local-learning completion counter is incremented.

Then, the computer determines whether the AFRDT deviates in step 303. When the detecting time deviates (the deviation-determination flag=1), the procedure proceeds to step 304 in which the computer determines whether the Local-learning completion flag is set to "0" or the count value of the Local-learning completion counter is greater than or equal to the specified value "T1".

When the answer is YES in step 304, the procedure proceeds to step 305 in which the Local-learning completion counter is reset to "0", the Local-learning completion flag is reset to "0", and a Local-learning execution counter is incremented.

Then, the procedure proceeds to step 306 in which the current correction value (fuel quantity correction value) of each cylinder is held. In step 307, the Local-learning routine shown in FIG. 16 is executed. In the Local-learning, the AFRDT is corrected so that the dispersion of the detection values of the air fuel ratio sensor 36 becomes a maximum value in one cycle of the engine 11.

When the answer is NO in step 304, the procedure proceeds to step 310 in which the Global-learning routine shown in FIG. 17 is executed. In the Global-learning, the AFRDT is corrected by a combustion interval of the engine (for example, 180 CA degree). Alternatively, the AFRDT is multiplied twice or more.

[Local-Learning Routine]

A Local-learning routine shown in FIG. 16 is a subroutine executed in step 307 of the AFRDT deviation correction routine shown in FIG. 15. This Local-learning routine functions as a first time-correction portion. The Local-learning routine shown in FIG. 16 is different from the routine shown in FIG. 7 only in that the processings in steps 403 and 404 in FIG. 7 are replaced by processings in steps 403*a*, 403*b* and 404*a*. The other steps in FIG. 16 are the same as those in FIG. 7.

In step 401, the computer determines whether the counting value of the Local-learning execution counter is lower than or equal to a specified value. When the answer is YES in step 401, the procedure proceeds to step 402 in which the local-learning index computation routine shown in FIG. 8 is executed, whereby a detected air-fuel ratio distribution V(Local-learning index) is computed with respect to each case where the AFRDT of first cylinder #1 is assumed as a time "L1" to "L6".

Then, the procedure proceeds to step 403*a* in which the detected air-fuel ratio distribution V(Local-learning index) is normalized with respect to each case where the AFRDT of first cylinder #1 is assumed as a time "L1" to "L6".

Specifically, with respect to each of the detected air-fuel ratio distributions V(Dcal−90), V(Dcal−60), V(Dcal−30), V(Dcal), V(Dcal+30) and V(Dcal+60), higher score point (for example, 5 to 0 point) is added sequentially from the higher detected air-fuel ratio distribution. These scores points Point(Dcal−90), Point(Dcal−60), Point(Dcal−30), Point(Dcal), Point(Dcal+30) and Point(Dcal+60) are defined as normalization indexes (normalized detected air-fuel ratio distribution V).

$$V(\mathrm{Dcal}-90)\rightarrow \mathrm{Point}(\mathrm{Dcal}-90)$$

$$V(\mathrm{Dcal}-60)\rightarrow \mathrm{Point}(\mathrm{Dcal}-60)$$

$$V(\mathrm{Dcal}-30)\rightarrow \mathrm{Point}(\mathrm{Dcal}-30)$$

$$V(\mathrm{Dcal})\rightarrow \mathrm{Point}(\mathrm{Dcal})$$

$$V(\mathrm{Dcal}+30)\rightarrow \mathrm{Point}(\mathrm{Dcal}+30)$$

$$V(\mathrm{Dcal}+60)\rightarrow \mathrm{Point}(\mathrm{Dcal}+60)$$

Then, the procedure proceeds to step 403*b*. In step 403*b*, with respect to each case where the AFRDT of the first cylinder #1 is assumed as a time "L1" to "L6", the integrated value of the normalization index (normalized detected air-fuel ratio distribution V) is multiplied by the current normalization index to update the integrated value of the normalization index.

When the computer determines that the counting value of the Local-learning execution counter has exceeded the specified value in step 401, the computer determines that the integrated value of the normalization index is computed for specified time period. The procedure proceeds to step 404*a*. In step 404*a*, a time at which the integrated value of the normalization index becomes maximum is selected as the most appropriated time.

Then, the procedure proceeds to step 405 in which the selected most appropriated time is learned as the AFRDT of first cylinder #1 and the AFRDTs of other cylinders are learned on the basis of the AFRDT of the first cylinder #1. These learning values are stored in a storage area of a rewritable nonvolatile memory of backup RAM of ECU 39.

Then, the procedure proceeds to step 406 in which the counting value of the Local-learning execution counter is reset to "0", the deviation-determination flag is reset to "0", and the Local-learning completion flag is set to "1". In step 407, the correction value (fuel quantity correction value) of each cylinder is reset to a specified value.

[Global-Learning Routine]

A Global-learning routine shown in FIG. 17 is a subroutine executed in step 310 of the AFRDT deviation correction routine shown in FIG. 15. This Global-learning routine functions as a second time-correction portion.

After the Local-learning is executed, the Global-learning is executed. In the Global-learning, the AFRDT is corrected by a combustion interval of the engine (for example, 180 CA degree). Alternatively, the AFRDT is multiplied twice or more.

In step 601, a Global-learning execution counter is incremented. In step 602, the computer determines whether the counting value of the Global-learning execution counter is "1."

When the computer determines that the counting value of a Global-learning execution counter is "1", that is, when the computer determines that it is a first Global-learning after Local-learning is executed, the procedure proceeds to step 603. In step 603, the AFRDT of each cylinder is advanced by a combustion interval (for example, 180 CA degree), whereby the learning value of the AFRDT of each cylinder is corrected to the AFRDT of the successive combustion cylinder which is advanced relative to the AFRDT of right after the Local-learning. Then, the procedure proceeds to step 608 in which the fuel quantity correction value of each cylinder is reset to a specified value (for example, an initial value) to end the routine.

Meanwhile, when the computer determines that the counting value of a Global-learning execution counter is not "1", the procedure proceeds to step 604 in which the computer determines whether the counting value of the Global-learning execution counter is "2."

When the computer determines that the counting value of a Global-learning execution counter is "2", that is, when the computer determines that it is a second Global-learning after Local-learning is executed, the procedure proceeds to step 605. In step 605, the learning value of the AFRDT of each cylinder is advanced by a double combustion interval (for example, 360 CA degree), whereby the learning value of the AFRDT of each cylinder is corrected to the AFRDT of the successive combustion cylinder which is retarded relative to the AFRDT of right after the Local-learning. Then, the procedure proceeds to step 408 in which the correction value (fuel quantity correction value) of each cylinder is reset to a specified value.

Meanwhile, when the computer determines that the counting value of a Global-learning execution counter is not "2" in step 604, the computer determines that the counting value of the Global-learning execution counter is "3." That is, the computer determines that it is a third Global-learning after Local-learning is executed. The procedure proceeds to step 606 in which the learning value of the AFRDT of each cylinder is retarded by a combustion interval (for example, 180 CA degree), whereby the learning value of the AFRDT of each cylinder is corrected to the AFRDT of a cylinder other than the successive combustion cylinder. Then, the procedure proceeds to step 607 in which the Local-learning completion flag is reset to "0", the Local-learning completion counter is reset to "0", and the Global-learning execution counter is reset to "0".

Since the Local-learning completion flag is reset to "0" in step 607, the Local-learning can be executed again when the computer determines that the AFRDT deviates even though the AFRDT is corrected by a value corresponding to one cycle in the Global-learning (even though the Global-learning is executed once to three times.) Then, the procedure proceeds to step 608 in which the fuel quantity correction value of each cylinder is reset to a specified value (for example, an initial value) to end the routine.

Figure 18:
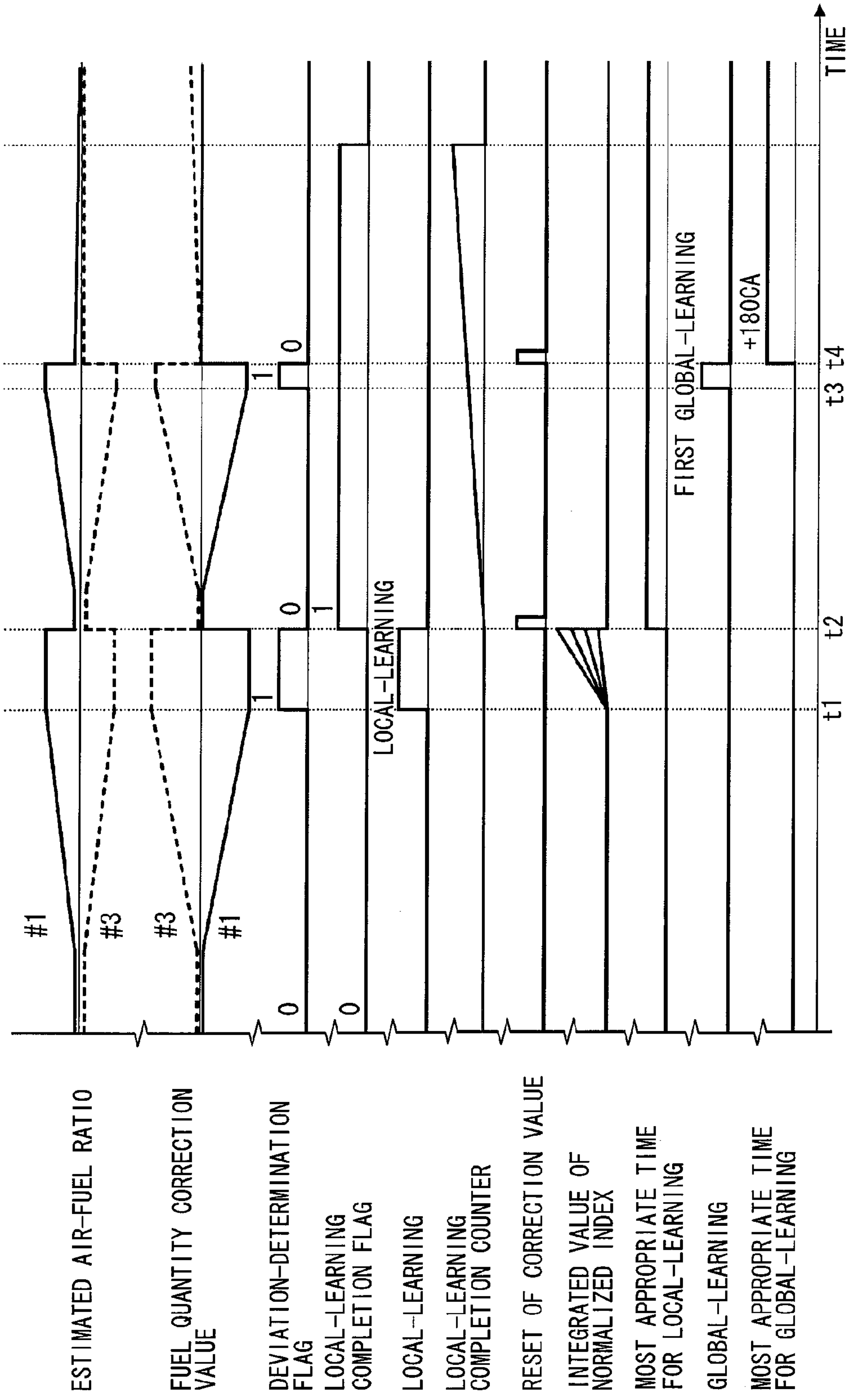
FIG. 18 is a time chart showing the air-fuel ratio detecting time deviation correction according to the third embodiment.
Figure 19:
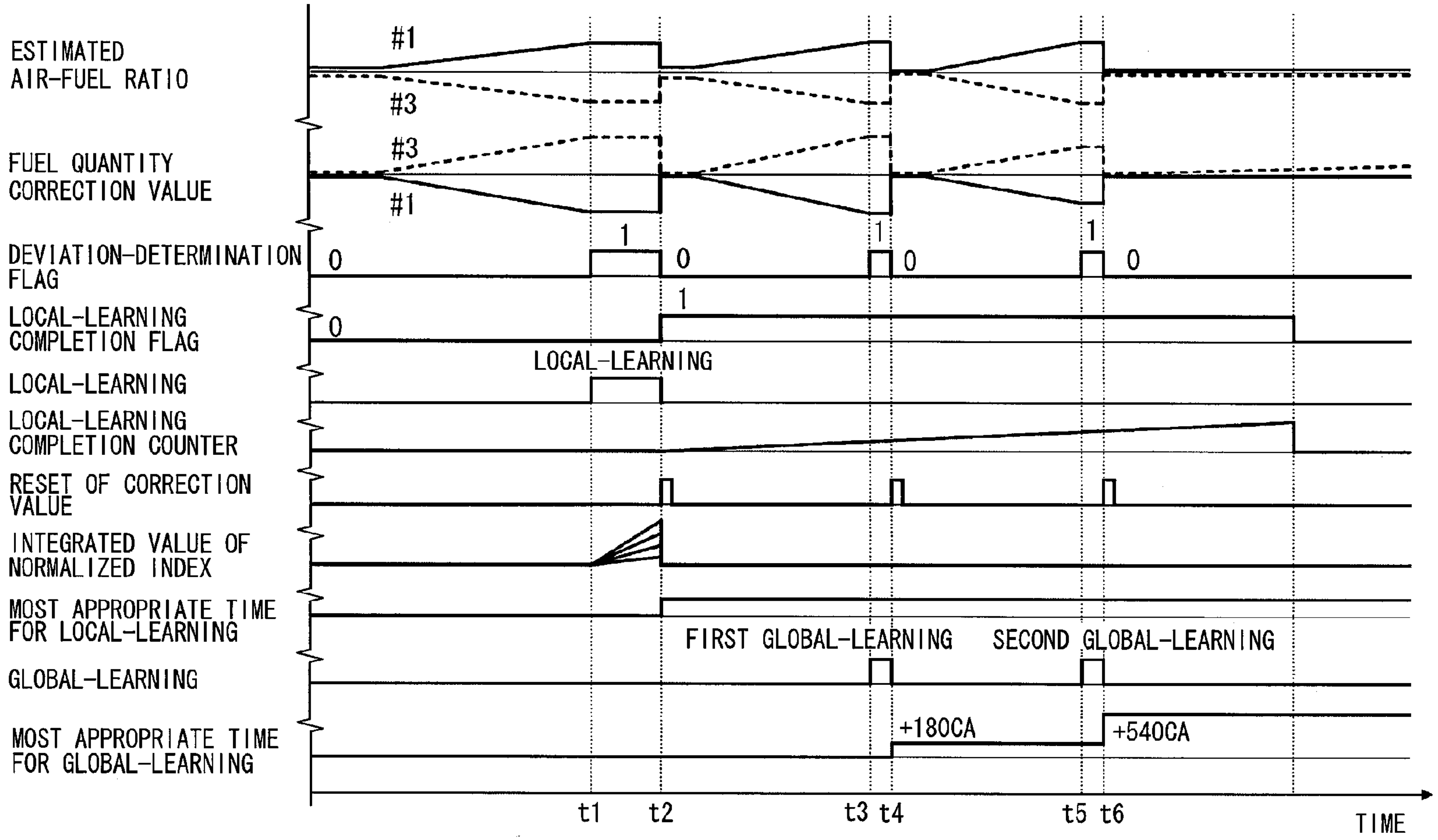
FIG. 19 is another time chart showing the air-fuel ratio detecting time deviation correction according to the third embodiment.
Figure 20:
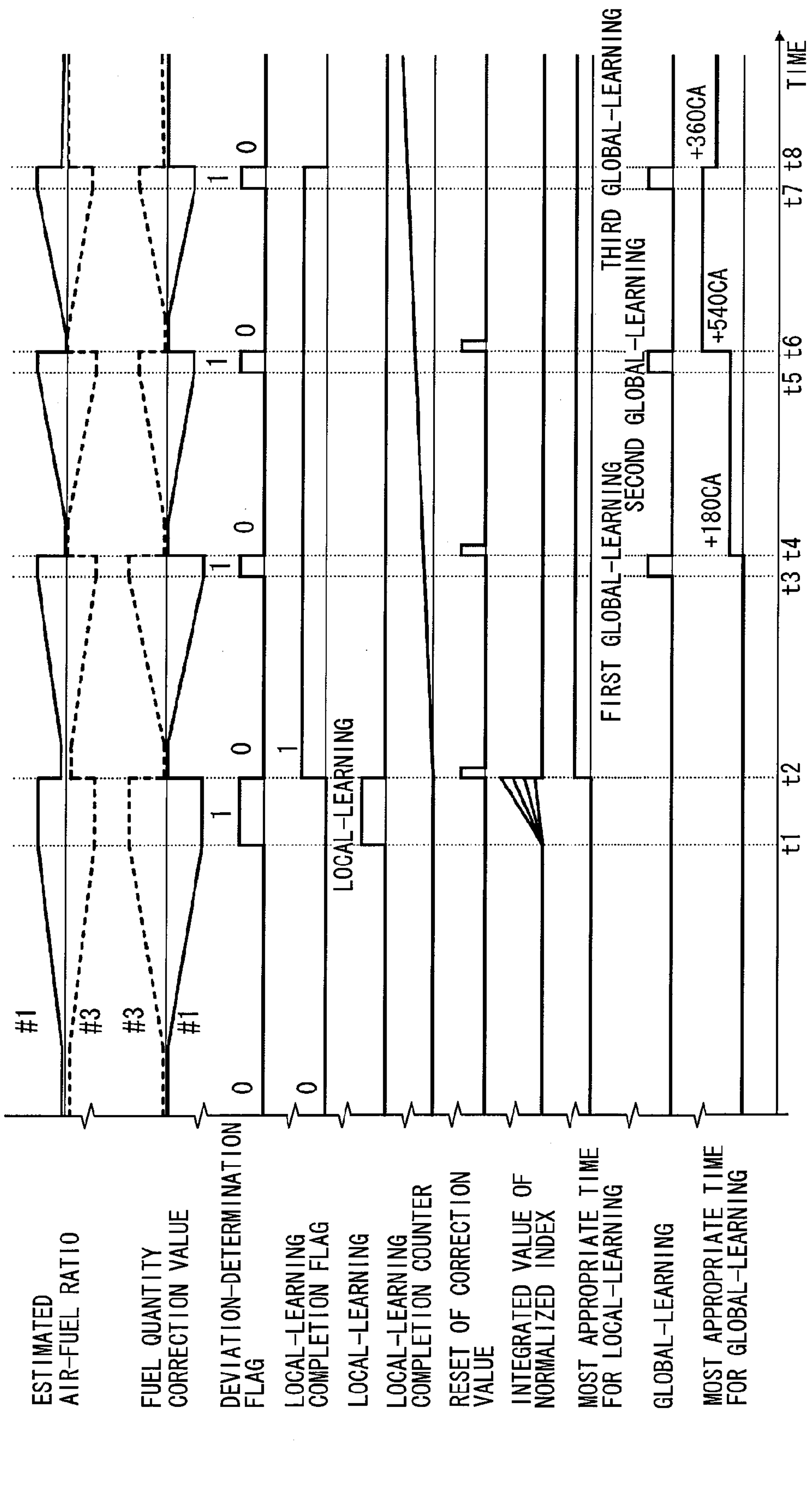
FIG. 20 is another time chart showing the air-fuel ratio detecting time deviation correction according to the third embodiment.

Referring to FIGS. 18 to 20, according to the third embodiment, an example of execution of the deviation learning correction of the AFRDT will be described.

As shown in FIG. 18, while the cylinder-by-cylinder air-fuel ratio control is executed, when the computer determines that the AFRDT deviates and the deviation-determination flag is set to "1" at a time "t1", the fuel quantity correction value of each cylinder is held at current value and the Local-learning is executed. In the Local-learning, the AFRDT is corrected so that the dispersion of the detection values of the air fuel ratio sensor 36 becomes a maximum value in one cycle of the engine 11. In the Local-learning, with respect to each case where the AFRDT of the first cylinder #1 is assumed as time "L1" to "L6" CA degree, the computer computes the integrated value of the normalization index (normalized detected air-fuel ratio distribution V). The time at which the integrated value of the normalization index becomes a maximum value is selected and learned as the most appropriated time.

When the Local-learning is completed at a time "t2", the deviation-determination flag is reset to "0", the Local-learning completion flag is set to "1", and the correction value (fuel quantity correction value) of each cylinder is reset to a specified value (for example, an initial value). Moreover, the Local-learning completion flag is set to "1", whereby the Local-learning completion counter starts to increment.

After that, when the computer determines that the AFRDT deviates again and the deviation-determination flag is set to "1" at a time "t3", the computer executes a first Global-learning after the Local-learning is executed. In the first Global-learning, the learning value of the AFRDT of each cylinder is advanced by a combustion interval (for example, 180 CA degree), whereby the learning value of the AFRDT of each cylinder is corrected to the AFRDT of the successive combustion cylinder which is advanced relative to the AFRDT of right after the Local-learning.

When the first Global-learning is completed at a time "t4", the correction value (fuel quantity correction value) of each cylinder is reset, so that the deviation-determination flag is reset to "0". After that, when the counting value of the Local-learning completion counter becomes greater than or equal to a specified value with the deviation-determination flag kept at "0", the Local-learning completion counter is reset to "0" and the Local-learning completion flag is reset to "0".

Meanwhile, as shown in FIG. 19, after the first Global-learning is completed and before the counting value of the Local-learning completion counter becomes greater than or equal to a specified value, when the computer determines that the AFRDT deviates again and the deviation-determination flag is set to "1", the second Global-learning is executed at a time "t5". In the second Global-learning, the learning value of the AFRDT of each cylinder is advanced by a double combustion interval (for example, 360 CA degree), whereby the learning value of the AFRDT of each cylinder is corrected to the AFRDT of the successive combustion cylinder which is retarded relative to the AFRDT of right after the Local-learning.

When the second Global-learning is completed at a time "t6", the correction value (fuel quantity correction value) of each cylinder is reset, so that the deviation-determination flag is reset to "0". After that, when the counting value of the Local-learning completion counter becomes greater than or equal to a specified value with the deviation-determination flag kept at "0", the Local-learning completion counter is reset to "0" and the Local-learning completion flag is reset to "0".

Meanwhile, as shown in FIG. 20, after the second Global-learning is completed and before the counting value of the Local-learning completion counter becomes greater than or equal to a specified value, when the computer determines that the AFRDT deviates again and the deviation-determination flag is set to "1", the third Global-learning is executed at a time "t7". In the third Global-learning, the learning value of the AFRDT of each cylinder is retarded by a combustion interval (for example, 360 CA degree), whereby the learning value of the AFRDT of each cylinder is corrected to the AFRDT of a cylinder other than the successive combustion cylinder.

When the third Global-learning is completed at a time "t8", the Local-learning completion flag is reset to "0" and the correction value (fuel quantity correction value) of each cylinder is reset, so that the deviation-determination flag is reset to "0". After that, when the counting value of the Local-learning completion counter becomes greater than or equal to a specified value with the deviation-determination flag kept at "0", a Local-learning completion counter is reset to "0".

When the third Global-learning is completed at a time "t8", the Local-learning completion flag is reset to "0". Thus, even if it is before the counting value of the Local-learning completion counter becomes greater than or equal to a specified value, when the computer determines that the AFRDT deviates again and the deviation-determination flag is set to "1", the Local-learning is executed again.

According to the third embodiment described above, the computer executes the Local-learning in which the AFRDT is corrected so that the dispersion of the detection values of the air fuel ratio sensor 36 becomes a maximum value in one cycle of the engine 11. After the Local-learning is executed, when the computer determines that the AFRDT deviates, the Global learning is executed, In the Global-learning, the AFRDT is corrected by a combustion interval of the engine. Alternatively, the AFRDT is multiplied twice or more. Thus, the deviation of the AFRDT can be corrected with high accuracy in a short period. Furthermore, in the Global-learning, the AFRDT of each cylinder is replaced by the AFRDT of other cylinder. Thus, it is unnecessary to compute the correlation coefficient (for example, a correlation coefficient between a variation of the estimated air fuel ratio of each cylinder and a variation of the correction value of each cylinder) for determining an AFRDT. Thus, a computing load of the ECU 39 can be reduced. Also, even when the response characteristic of the air fuel ratio sensor 36 is varied and a variation direction of the correction value (fuel quantity correction value) of each cylinder and the variation direction of the estimated air fuel ratio becomes opposite due to noises (combustion dispersion and transient), the AFRDT of each cylinder can be corrected to a right AFRDT without receiving the above influences.

When the computer determines that the AFRDT deviates after the Local learning is executed, it is often that the correct AFRDT of each cylinder is the current AFRDT of the successive combustion cylinder. In view of this, according to the third embodiment, when the computer determines that the AFRDT deviates after the execution of the Local-learning, the Global-learning is executed to correct the AFRDT. In the Global-learning, the AFRDT of each cylinder is corrected to the AFRDT of the successive combustion cylinder. After that, the AFRDT of each cylinder is corrected to the AFRDT of a cylinder other than the successive combustion cylinder. Thus, the deviation of the AFRDT can be corrected with high accuracy in a short period.

Furthermore, according to the third embodiment, when the computer determines that the AFRDT deviates even though the AFRDT is corrected by a value corresponding to one cycle in the Global-learning, the Local-learning is executed again to correct the AFRDT. Thus, even if the Local-learning is not correct, a Local-learning can be executed again promptly.

According to the third embodiment, in the Local-learning, the AFRDT is corrected so that the integrated value of the data corresponding to a normalized detected air-fuel ratio distribution V becomes a maximum value. Therefore, even when the detected air-fuel ratio distribution V becomes large temporarily, its influences can be reduced and the correction accuracy of the AFRDT by a Local-learning can be further improved.

In the above first embodiment, the AFRDT is corrected so that the integrated value of the detected air-fuel ratio distribution V becomes a maximum value in the Local-learning. However, the AFRDT may be corrected so that the integrated value of the data corresponding to a normalized detected air-fuel ratio distribution V becomes a maximum value.

According to the third embodiment, in the Local-learning, the AFRDT is corrected so that the integrated value of the data corresponding to a normalized detected air-fuel ratio distribution V becomes a maximum value. However, the AFRDT may be corrected so that the integrated value of the detected air-fuel ratio distribution V becomes a maximum value in the Local-learning. Alternatively, the AFRDT may be corrected so that the integrated value of the amplitude of the detected air-fuel ratio becomes a maximum value in the Local-learning.

According to the third embodiment, in the Global-learning, the AFRDT of each cylinder is corrected to the AFRDT of the successive combustion cylinder. After that, the AFRDT of each cylinder is corrected to the AFRDT of a cylinder other than the successive combustion cylinder. However, the AFRDT of each cylinder may be corrected (advanced or retarded) by a combustion interval.

The present invention can be applied to an engine having four cylinders and an engine having two, three, five or more cylinders.

The present invention is not limited to an intake port injection engine. The present invention can be applied to a direct injection engine or a dual injection engine.

What is claimed is:

1. A cylinder-by-cylinder air-fuel ratio controller for an internal combustion engine that is provided with an air-fuel ratio sensor detecting an air-fuel ratio of an exhaust gas at a confluent portion into which the exhaust gas flows from multiple cylinders of the internal combustion engine; a cylinder-by-cylinder air-fuel-ratio estimation portion estimating the air-fuel ratio of each cylinder based on a detection value which the air-fuel ratio sensor detects at an air-fuel ratio detecting time for each cylinder; and a cylinder-by-cylinder air-fuel ratio control portion executing a cylinder-by-cylinder air-fuel ratio control in which the air-fuel ratio of each cylinder is adjusted based on the estimated air-fuel ratio of each cylinder, the cylinder-by-cylinder air-fuel ratio controller comprising:

a first time-correction portion correcting the air-fuel ratio detecting time in such a manner that a dispersion of the detection values of the air fuel ratio sensor becomes maximum in one cycle of the internal combustion engine; and a second time-correction portion correcting the air-fuel ratio detecting time in such a manner that the air-fuel ratio detecting time is varied by a combustion interval of the internal combustion engine or the air-fuel ratio detecting time is varied by a multiple of the combustion interval that is two or more, when it is determined that the air-fuel ratio detecting time deviates after the first time-correction portion corrects the air-fuel ratio detecting time.

2. A cylinder-by-cylinder air-fuel ratio controller for an internal combustion engine according to claim 1, wherein:

the second time-correction portion corrects the air-fuel ratio detecting time of each cylinder to the air-fuel ratio detecting time of a successive combustion cylinder; and then the second time-correction portion corrects the air-fuel ratio detecting time of each cylinder to the air-fuel ratio detecting time of a cylinder other than the successive combustion cylinder.

3. A cylinder-by-cylinder air-fuel ratio controller for an internal combustion engine according to claim 1, wherein:

when it is determined that the air-fuel ratio detecting time deviates even though the second time-correction portion corrects the air-fuel ratio detecting time by a value corresponding to one cycle, the first time-correction portion corrects the air-fuel ratio detecting time again.

* * * * *